Figure 1:
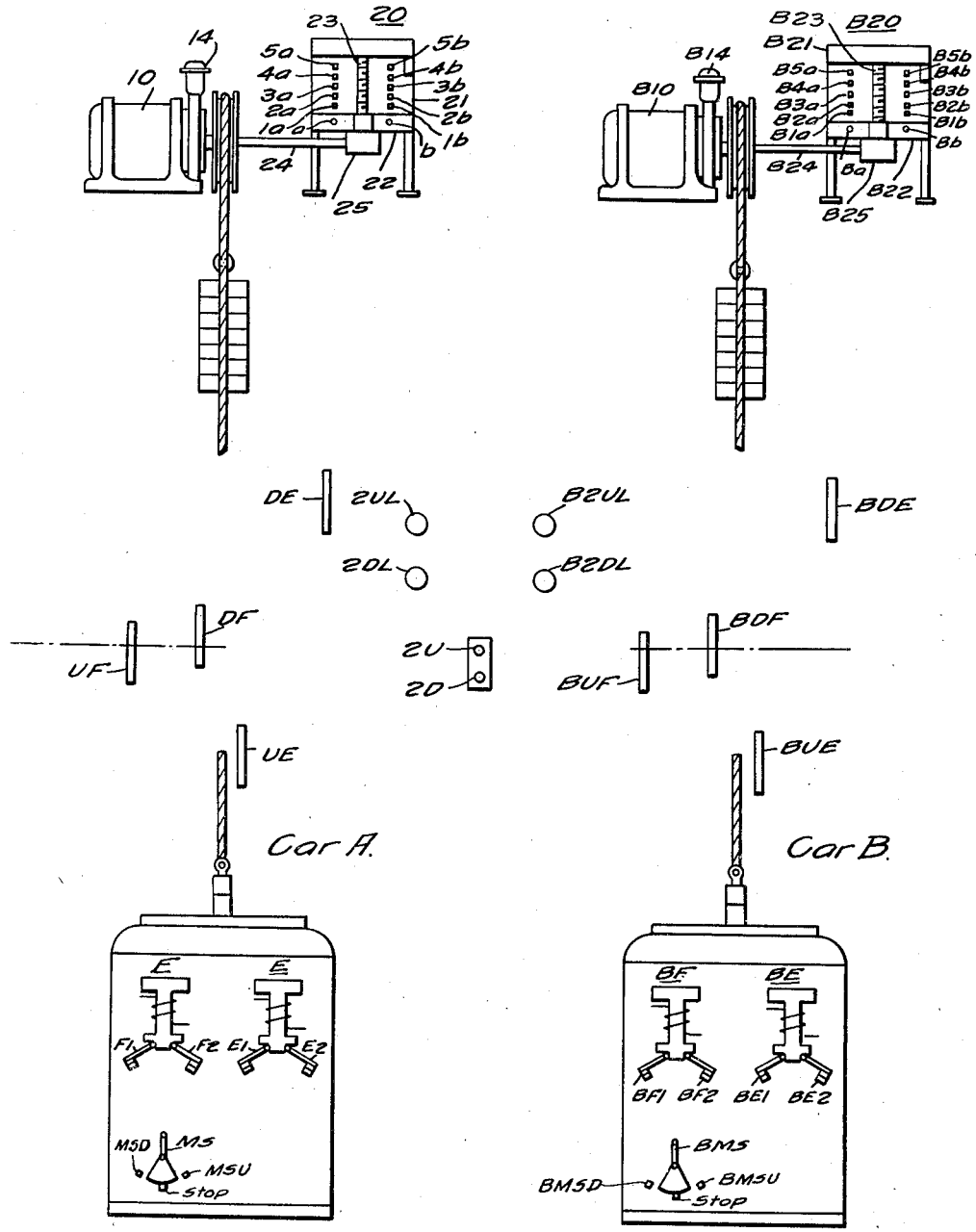

Aug. 23, 1938.  H. W. WILLIAMS  2,128,063
ELEVATOR CONTROL SYSTEM
Filed Dec. 9, 1936   14 Sheets-Sheet 1

WITNESSES:
E. A. McClusky
G. O. Harrison

INVENTOR
Harold W. Williams.
BY
ATTORNEY

Aug. 23, 1938.     H. W. WILLIAMS     2,128,063
ELEVATOR CONTROL SYSTEM
Filed Dec. 9, 1936     14 Sheets-Sheet 7

Fig. 7

INVENTOR
Harold W. Williams.
BY
ATTORNEY

Aug. 23, 1938.  H. W. WILLIAMS  2,128,063
ELEVATOR CONTROL SYSTEM
Filed Dec. 9, 1936   14 Sheets-Sheet 8

Fig. 8.

WITNESSES:
E. A. McCloskey
J. O. Harrison

INVENTOR
Harold W. Williams
BY
ATTORNEY

Aug. 23, 1938.　　　H. W. WILLIAMS　　　2,128,063

ELEVATOR CONTROL SYSTEM

Filed Dec. 9, 1936　　　14 Sheets-Sheet 10

INVENTOR
Harold W. Williams

Aug. 23, 1938.  H. W. WILLIAMS  2,128,063
ELEVATOR CONTROL SYSTEM
Filed Dec. 9, 1936  14 Sheets-Sheet 11

WITNESSES:

INVENTOR
Harold W. Williams
BY
ATTORNEY

Aug. 23, 1938.　　　H. W. WILLIAMS　　　2,128,063
ELEVATOR CONTROL SYSTEM
Filed Dec. 9, 1936　　　14 Sheets-Sheet 12

WITNESSES:

INVENTOR
Harold W. Williams
BY
ATTORNEY

Aug. 23, 1938.    H. W. WILLIAMS    2,128,063
ELEVATOR CONTROL SYSTEM
Filed Dec. 9, 1936    14 Sheets-Sheet 13

WITNESSES:

INVENTOR
Horold W. Williams.
BY
ATTORNEY

Aug. 23, 1938.  H. W. WILLIAMS  2,128,063
ELEVATOR CONTROL SYSTEM
Filed Dec. 9, 1936  14 Sheets-Sheet 14

WITNESSES:

INVENTOR
Harold W. Williams
BY
ATTORNEY

Patented Aug. 23, 1938

2,128,063

UNITED STATES PATENT OFFICE 2,128,063

ELEVATOR CONTROL SYSTEM

Harold W. Williams, Chicago, Ill., assignor to Westinghouse Electric Elevator Company, Chicago, Ill., a corporation of Illinois Application December 9, 1936, Serial No. 114,960

39 Claims. (Cl. 187—29)

The present invention relates to systems of control for electric elevators and more particularly to such systems in which a number of elevator cars operating together as a bank are controlled by passenger-operated push buttons located at the various floor landings.

Many systems have been developed in which push buttons located at the various floors of the building are effective to cause the stopping of one or more elevator cars which serve the corresponding floors. In certain of these systems, the push buttons at the floor landings are associated with all of the cars of the bank and cause the stopping of a selected one of such cars upon its approach to the corresponding floor, travelling in the corresponding direction. In others, push buttons individual to each car are located at the floor landings, and operation of any button is effective to stop only the corresponding car, as disclosed in the patent of Edgar M. Bouton and William F. Eames, No. 2,066,906, assigned to the Westinghouse Electric Elevator Company.

The systems in which the push buttons are common to all of the cars have been alternatively arranged so that operation of the button registers a call which is available to any of the cars of the bank, but which is not appropriated to any particular car until one of the cars approaches within a certain distance of the corresponding floor; or so that operation of any button registers a call which is immediately appropriated to a particular car, usually the car which is nearest the corresponding car at the time the call is registered.

In the operation of each of the systems mentioned above, there is a tendency for the several elevator cars to distribute the building traffic unevenly, and, in the taller buildings, for the cars to become "bunched" and thus disrupt the intended spacing between the cars.

These systems also tend to provide better service at certain floors than at others, particularly during the noon and evening rush periods, at which times a relatively large number of calls are registered at practically all floors of the building within a relatively short period of time. At such rush periods, each elevator is filled to capacity by a relatively few stops, perhaps three or four. Each car is usually required to make these few stops at the upper floors and so passes the lower floors without stopping. Because of the frequency with which calls are registered, it has been found that the next car of the series is also filled to capacity by three or four stops at upper floors and so passes the lower floors without stopping. In the operation of these systems, therefore, the response to calls registered from lower floors of the building is delayed until most of the traffic from the upper floors has received attention.

In order to provide more uniform service throughout the building during heavy traffic peaks, the "quota system", as disclosed in the patents of Richard F. Jones, No. 2,104,522, and of William F. Eames, No. 2,014,478, both assigned to Westinghouse Electric & Manufacturing Company, has been devised. In accordance with the quota principle, each car is normally assigned a zone of floors extending in advance of itself up to the next car travelling in the same direction, or if no car is in advance of it travelling in the same direction, up to the last car travelling in the opposite directions. All corridor calls for service in the corresponding direction of travel registered at floors included in a car's zone are assigned to the car as soon as registered, until a predetermined number or quota of calls is received. Upon receipt of its quota of calls, the car loses its zone and cannot accept any further calls until it reaches a terminal. The zone of a car which has accepted its quota of calls is transferred to the next following car, so that the zone of the latter extends from its own position, past the car having its quota, up to the next succeeding car travelling in the same direction.

It has been found in practice that the quota system distributes the acceptance of calls between upper and lower floors satisfactorily during heavy traffic conditions, and this system provides a more uniform time interval between the operation of a push button and the stopping of a car in response thereto, throughout the entire range of floors served by the system. Because of this more uniform time interval, the percentage of stops which result in the picking up of a single passenger is decreased; the average number of passengers picked up per stop is increased;

the average number of stops per trip is decreased; and the average number of trips for the system as a whole per unit time is increased, as compared to corresponding values for systems otherwise similar but lacking the quota feature. However, in the quota systems of the prior art, such as disclosed in the Jones and Eames patents mentioned above, as in other systems employing zoning of the hatchway, a car may overtake an earlier dispatched car and gain a distance of several floors in advance of it. In such a case, the floors between the overtaking car and the one passed are transferred to the zone of the latter, and any accepted calls at these floors tend to retard the delayed car still further and to lengthen its zone. At times, therefore, the cars may arrive at a terminal in a different sequence from that in which they were dispatched from other terminals.

The present invention relates to quota systems, and has for one object the control of the system in such manner that, when one car overtakes another, the burden of answering floor calls is imposed more heavily on the overtaking car rather than the car being overtaken, so as to tend to equalize the trip time of the two cars.

Another object of my invention is to provide an elevator system of the type indicated above, in which part or all of the calls assigned to a car are transferred to a later-dispatched car which overtakes it.

A further object of my invention is to provide an elevator system of the type indicated, in which floor lantern transfers are made at the time a car stops, in the event that the car is stopping in response to a call previously assigned to a different car.

Another object of my invention is to provide a novel elevator system in which floor calls are assigned to a definite car as soon as registered, but are appropriated by another car in the event that the latter arrives at the calling floor in the proper direction to answer the call, before the car to which the call was initially assigned arrives.

Another object of my invention is to provide a novel elevator system operating upon the quota principle which will include means for transferring the zone of an overtaken car to the car overtaking it.

It is a further object of my invention to provide a novel elevator system operating upon the quota principle, wherein, in the event that a car is overtaken by another one, the overtaken car answers the calls already assigned to it but no others.

A further object of my invention is to provide a novel elevator system in which common stopping apparatus for a plurality of cars is provided, this stopping apparatus being effective to stop the first car in condition to receive passengers which arrive at a calling floor, but the system being such that a car having more than a predetermined number of calls assigned thereto is disconnected from the common stopping apparatus.

A further object of my invention is to provide a novel elevator system of the quota type, in which calls are assigned to the cars as soon as received in accordance with zones of floors determined by the positions of the cars, and in which common stopping apparatus is provided for stopping any car which arrives first at a floor at which a call is registered.

Figure 9:
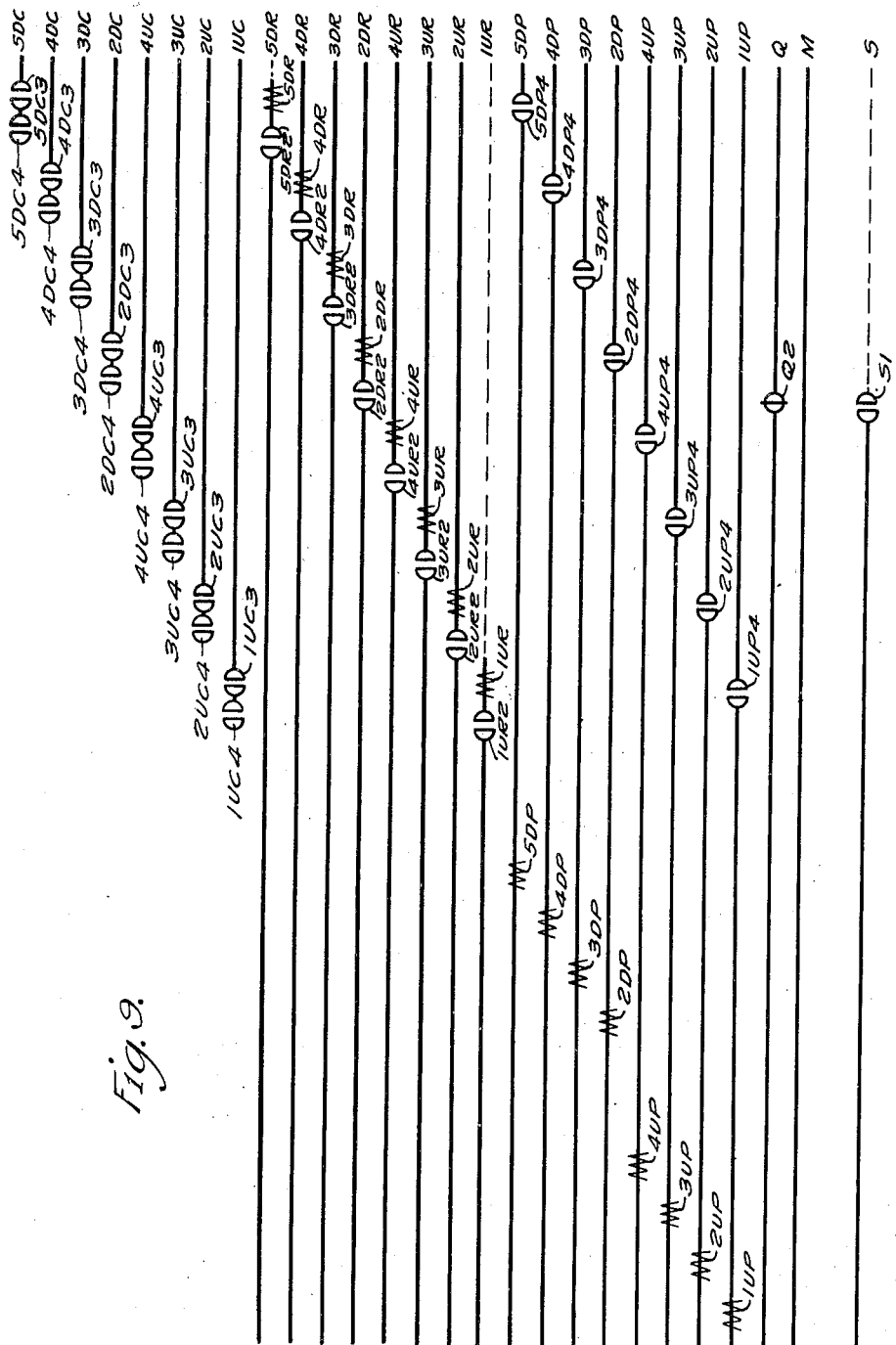
Figure 10:
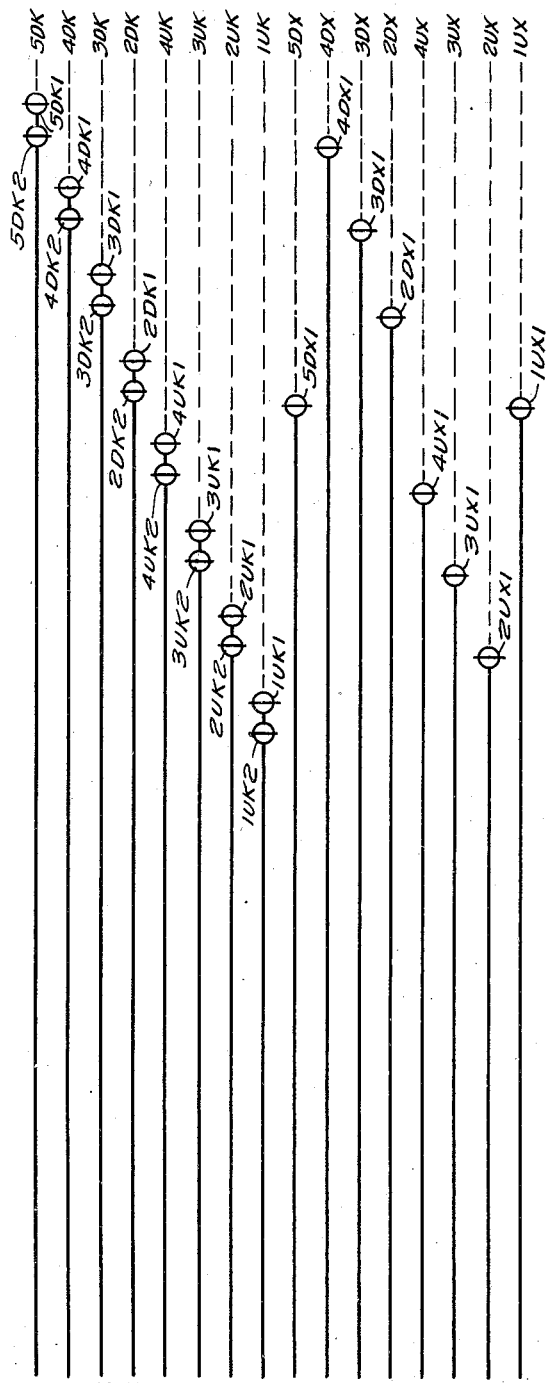
Figure 11:
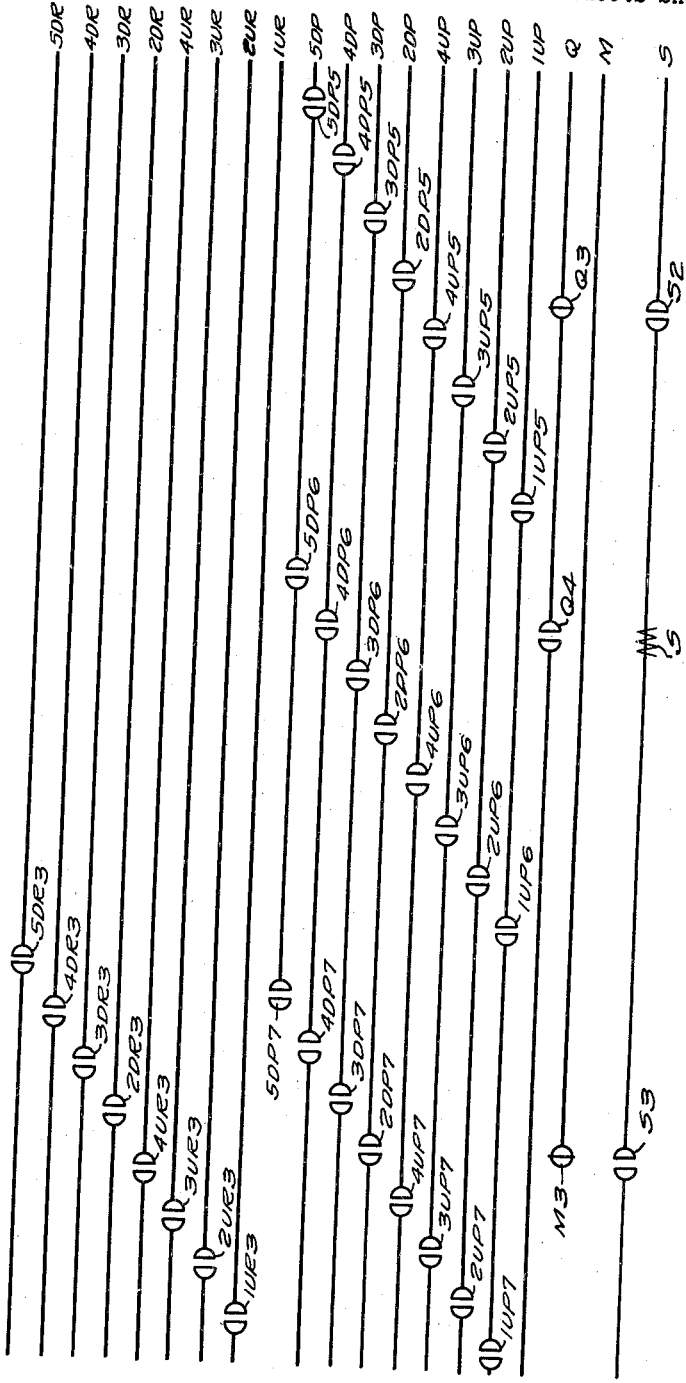
Figure 12:
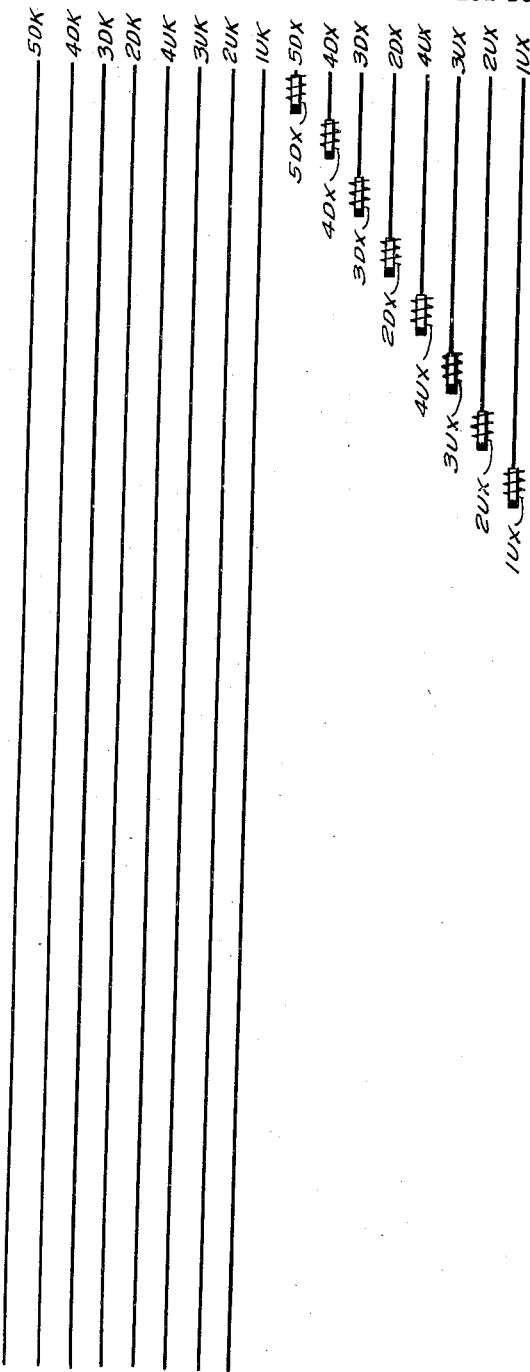
Figure 13:
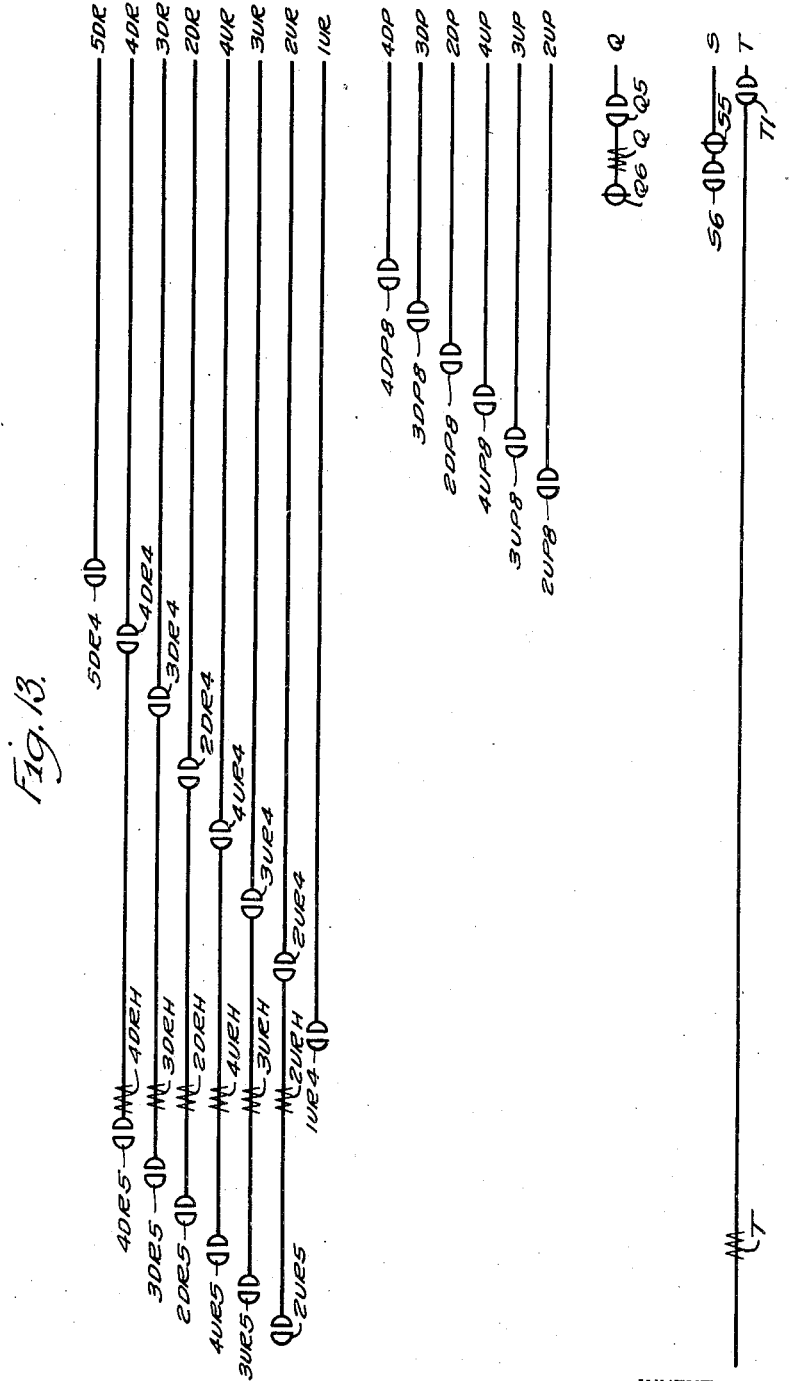
Figure 14:
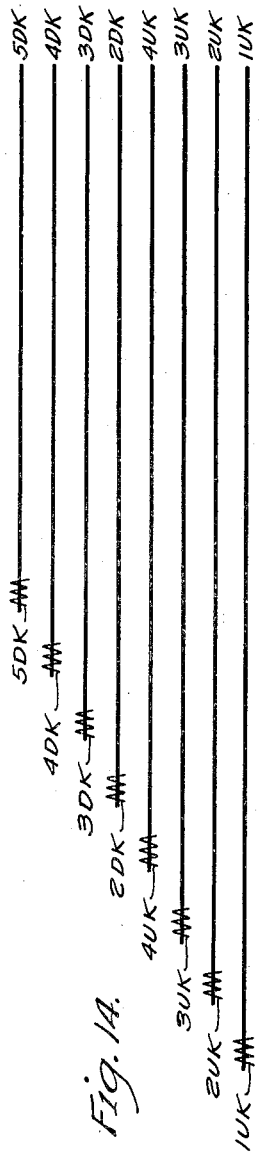

Other objects of my invention will become evident from the following detailed description taken in conjunction with the accompanying drawings, in which:

Figure 1 is a diagrammatic view of certain mechanical elements which may be used in the practice of my invention, Figs. 2, 3, 4, 5 and 6 are diagrammatic views, which together illustrate a complete control system for two cars, arranged in accordance with the present invention. These figures may be conveniently placed one above the other, in the order mentioned, with Fig. 2 at the top, Figs. 7 and 8 are key diagrams showing the relative positions of relay coils and contacts on Figs. 2 and 3, respectively. In Figs. 7 and 8, all coils and contact members are given the same horizontal positions on the sheets as the corresponding contacts on Figs. 2 and 3, respectively, Figs. 9 and 10 together constitute a key diagram for the coils and contacts of Fig. 4, Figs. 11 and 12 together constitute a key diagram showing the relative positions of coils and contacts of Fig. 5, and Figs. 13 and 14 together constitute a key diagram for the coils and contacts of Fig. 6.

Throughout the figures, the various reference characters serve as a guide to the relation between coils and contacts. For example, coil 1UR operated contacts 1UR1, 1UR2, 1UR3, etc.

Except where otherwise specified, in the following description, each of the relays or switches shown in the drawings, is of the usual electromagnetically operated type, comprising an operating electromagnet and a cooperating contact-carrying armature. Throughout the drawings, the contact members are shown in the position occupied thereby when the corresponding switch is in the deenergized condition. Contacts open under these conditions are illustrated by two short and slightly spaced semi-circular segments, and contacts closed under these conditions are illustrated by a small circular element having a short straight line drawn through the center.

*Description of apparatus*

The system illustrated in the drawings is arranged for controlling two cars A and B. The control systems individual to the two cars are identical and corresponding elements in each are given similar reference characters, except that for car B, each reference character is given a prefix B.

The control systems illustrated for the respective cars are of the type in which the car is started by means of a manually operable switch on the car and thereafter continues in operation until a stop is initiated in response to a hall button. In a practical embodiment of the invention, car buttons would also be used to initiate stops of the individual cars, but for simplicity such buttons and their associated circuits have been omitted from the drawings. The particular motor control system employed is not a novel part of the present invention, but has been illustrated, in Fig. 2, as being of the variable voltage or Ward-Leonard type, utilizing inductor switches to initiate the slow-down and stopping operations.

Figure 2:
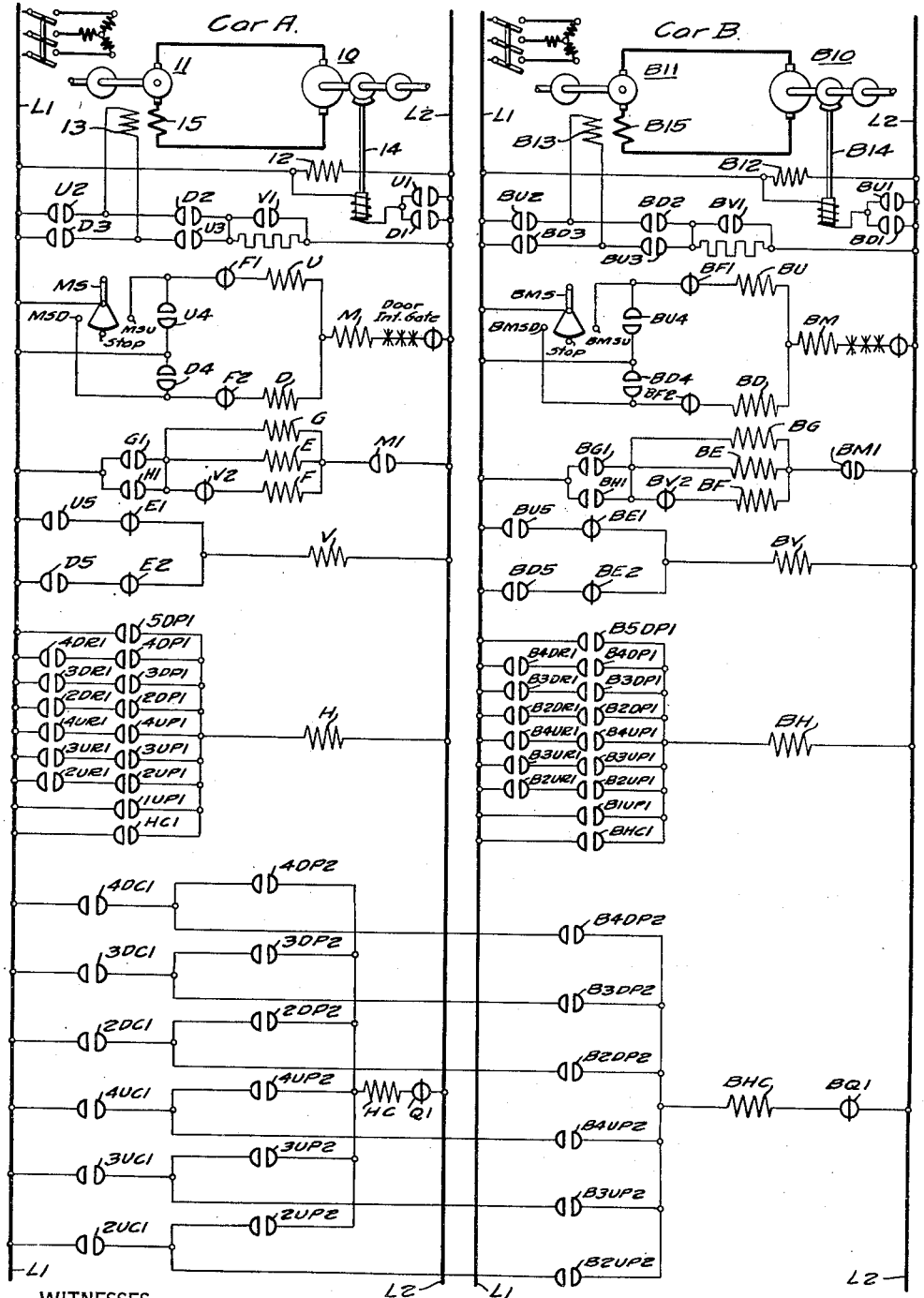

Referring to the left-hand half of Fig. 2, the control system for car A comprises a motor 10, the armature of which is connected in series with the armature of a generator 11. Motor 10 is provided with a field winding 12, which for purposes of description, has been illustrated as directly connected across two line conductors L1 and L2.

Generator 11 is provided with a separately excited field winding 13, the polarity and degree of excitation of which may be selectively controlled by means of up and down reversing switches U and D, and a speed switch V, to thereby control the direction and speed of motor 10. The usual electromagnetically released, spring applied brake 14 is associated with motor 10.

The system preferably embodies some form of speed regulating mechanism to render the operating speed of motor 10 substantially independent of the load on the elevator car, and this mechanism, for convenience, has been illustrated as comprising a cumulative series field winding 15 associated with generator 11.

The reversing switches U and D and the speed switch V are controlled in starting by means of a master switch MS, carried by the car, as shown in Fig. 1, and having up contacts MSU and down contacts MSD. The reversing switches U and D and the speed switch V are controlled during slow-down and stopping by means of a slow-down inductor switch E and a stopping inductor switch F, both of which are carried upon the elevator car.

Each elevator car A and B is provided with a suitable floor selector, which, for simplicity, is shown in Fig. 1 as of the screw-driven mechanical type. The floor selector 20 for car A comprises a stationary panel 21, to which are attached a row of up segments and a row of down segments. The up row includes one segment for each intermediate floor and the upper terminal floor designated respectively 2a, 3a, 4a and 5a, and an auxiliary segment 1a for the lower terminal floor. The down row includes one segment for each intermediate floor and the lower terminal floor, designated 1b, 2b, 3b and 4b, and an auxiliary segment 5b for the upper terminal floor.

Floor selector 20 also comprises a screw-driven cross-head 22, which carries brushes a and b for cooperation with the up and down rows of segments, respectively. The cross-head 22 is reciprocated by screw 23 and is also mounted for a limited amount of rotation with it. With this latter arrangement, during upward travel of the car, the cross-head brush a engages its associated up segments but brush b does not engage its associated down segments, and, during downward movement, brush b engages its associated down segments, and brush a does not engage its associated up segments. Brushes a and b are preferably spring mounted, so that, upon a reversal of direction, a segment in the row, corresponding to the reverse direction of travel is engaged just before a segment in the other row is disengaged. Shaft 24 and a suitable reducing gear unit 25 are arranged to rotate screw 23 in response to movement of the elevator car.

The spacing of the segments is such that a brush engages a segment for a particular floor just after the car leaves the preceding floor, and remains in engagement therewith until the car has moved a similar distance past the particular floor. The brush dimensions are such that a segment for one floor is engaged just after the segment for a preceding floor is disengaged, there being a transition interval, during the period of travel of the brush from one segment to the next, when neither segment is engaged.

The inductor switches E and F, mentioned above, are preferably of the type disclosed in Patent No. 1,902,602, granted March 21, 1933, to Williams, et al. and assigned to the Westinghouse Electric Elevator Company. As there described, and as shown diagrammatically in Fig. 1, each inductor switch comprises an electromagnet and two contact-carrying armatures disposed in the magnetic circuit thereof. The arrangement of the switch is such that energization of the electromagnet has no immediate effect upon the positions of the associated armatures. When, however, the switch is moved into the region of a magnetizable plate associated with either armature, that armature moves to a contact-opening position. Preferably also, the armature remains in the contact-opening position, after having been initially moved thereto, as long as the electromagnet remains energized, even though the switch is moved out of the region of the magnetizable plate.

Inductor switch E is provided with an up contact armature E1 and a down contact armature E2, and inductor switch F is provided with corresponding up and down armatures F1 and F2. An inductor plate UE (see Fig. 1) for each intermediate floor and the upper terminal floor is associated with armature E1, and a corresponding inductor plate DE, individual to each intermediate floor and the lower terminal floor, is associated with armature E2. An inductor plate UF for each intermediate floor and the upper terminal floor is associated with armature F1, and an inductor plate DF for each intermediate floor and the lower terminal floor is associated with armature F2. A single complete set of such plates, for the second floor, is illustrated in Fig. 1.

The inductor plates associated with switch E are located in the hatchway in such position as to cause an operation of the corresponding armature when the car reaches the slow-down points for the respective floors, travelling in the corresponding direction, and the plates associated with switch F are located in the hatchway in such positions as to cause an operation of the corresponding armature just before the car reaches the respective floors, travelling in the corresponding direction.

Referring again to Fig. 2, the coils of inductor switches E and F are arranged to be controlled by means of a stopping relay H, a holding relay G, and an auxiliary control relay M. Relay H, in turn, is arranged to be selectively operated as the car approaches floors for which the calls are registered in response to contacts 4UR1, etc., of the floor relays, later described. Contacts 1UP1, 3DP1, etc., on a series of car position relays, later described, together with the contacts 1UR1, etc., of the floor relays, commutate the operating circuits for relay H, as the car approaches the several floors, travelling upwardly or downwardly.

An auxiliary stopping relay HC is also provided for initiating stops for car A in the event that the latter is dispatched later than car B and thereafter overtakes car B, disturbing the dispatching sequence. This condition will be more fully discussed in connection with the operation of the system.

Figure 3:
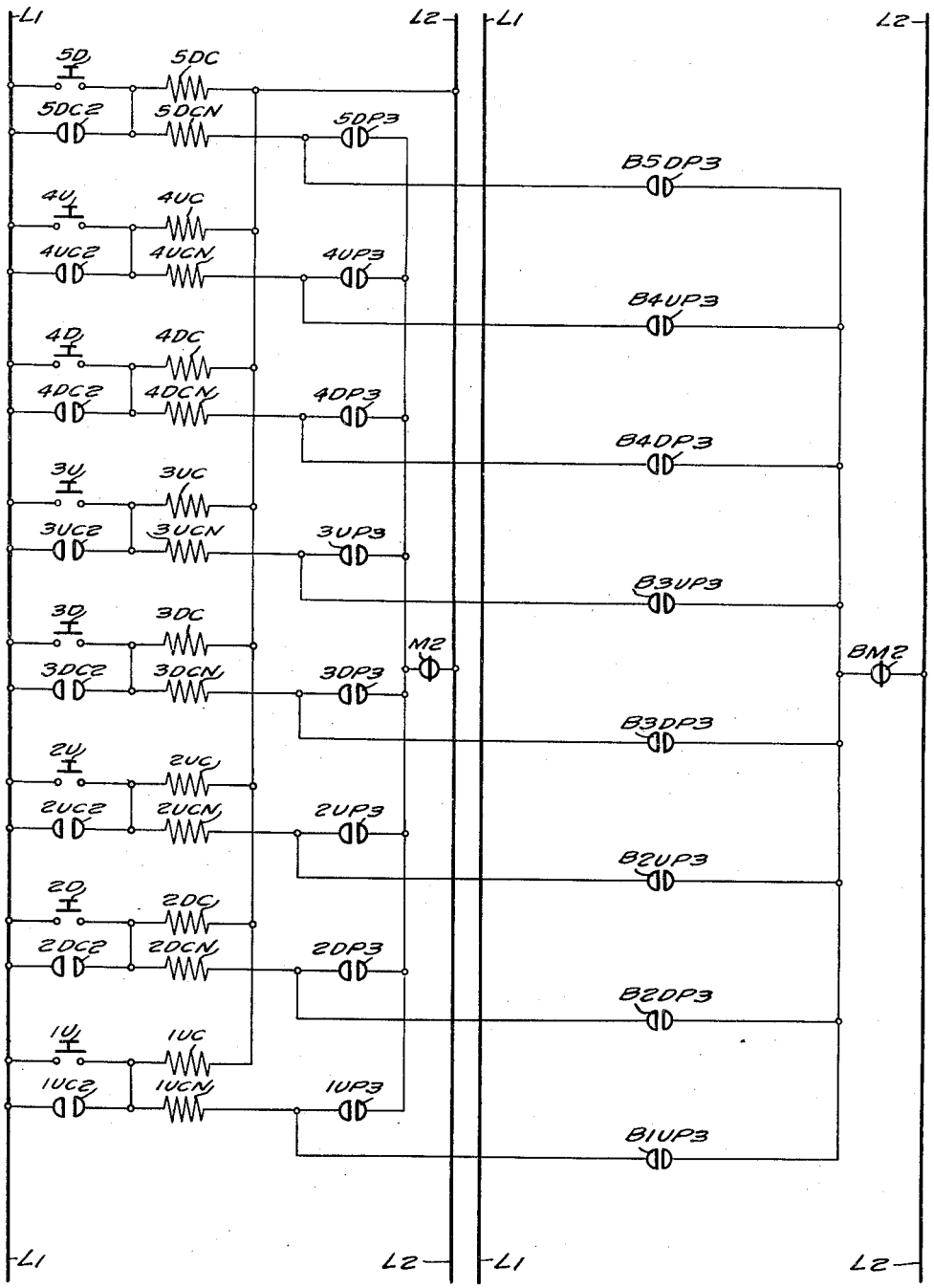

Referring to Fig. 3, the bank of elevators comprising cars A and B is provided with a common up floor relay for each intermediate floor and the lower terminal floor, and with a common down floor relay for each intermediate floor and the upper terminal floor. Each floor relay comprises an operating coil and a resetting coil. The relay armature is arranged to move to the actuated position upon energization of the operating coil and to resume the deenergized position upon energization of the resetting coil, which acts to magnetically oppose the effect of the operating coil.

The drawings illustrate a system arranged for three intermediate floors, and upper and lower terminal floors, and the up floor relay operating coils are designated 1UC, 2UC, 3UC and 4UC. The down floor relay operating coils are designated 2DC, 3DC, 4DC and 5DC. The resetting coils for these floor relays are shown immediately below the corresponding operating coils and have the same reference characters with the suffix N.

As shown in Fig. 3, the floor relays 1UC etc., are connected for actuation by push buttons corresponding to the various floor landings, the up floor buttons being designated 1U, 2U, 3U and 4U, and the down floor buttons being designated 2D, 3D, 4D and 5D.

Figure 4:
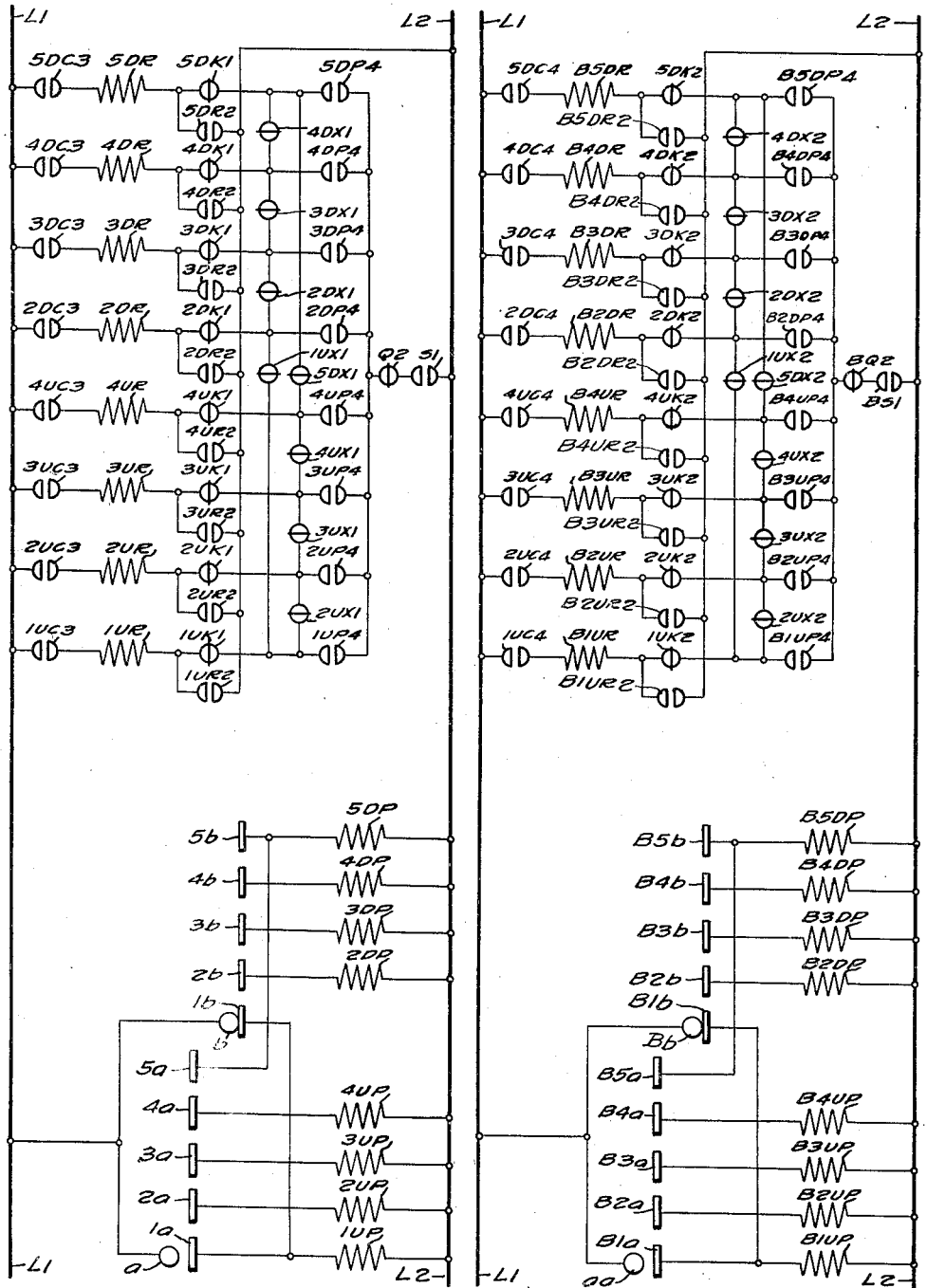

Referring to Fig. 4, the upper part of the figure shows a plurality of call storing relays, of which a set for both up and down directions is provided for each car. The up direction call-storing relays for car A are designated 1UR, 2UR, 3UR and 4UR, and the down direction call-storing relays for the same car are designated 2DR, 3DR, 4DR and 5DR. The corresponding call-storing relays for car B are denoted by the same reference characters with the prefix B added. The call storing relays 1UR, 2UR etc., are operated to select the car A or B which will accept a given hall call, dependent upon which car has the zone which includes the calling floor. Upon operation of any floor relay 1UC, 2UC, etc., of Fig. 3, one of the call storing relays 1UR or B1UR etc., of Fig. 4 immediately closes and stores the call until answered. The call storing relays 1UR, 2UR, etc., also control the floor lanterns at the various floors so as to provide instant signals as soon as a button is pushed. This operation, together with other operations performed by the call-storing relays 1UR, 2UR, etc., will be explained in more detail in connection with the operation of the system as a whole.

The lower part of Fig. 4 shows the circuits of the car position relays, car A being provided with an up car position relay for each intermediate floor and the lower terminal floor, designated 1UP, 2UP, etc., and a down car position relay for each intermediate floor and the upper terminal floor, designated 2DP, 3DP, etc. Car B is provided with similar relays, denoted by corresponding reference characters preceded by the prefix B.

The car position relays 1UP, 2UP etc., for each car are caused to respond directly to the position of the associated car by means of contact segments 1a, 2a, 3a, etc., and movable brushes a and b of the floor selectors 20 and B20, described above in connection with Fig. 1.

Figure 5:
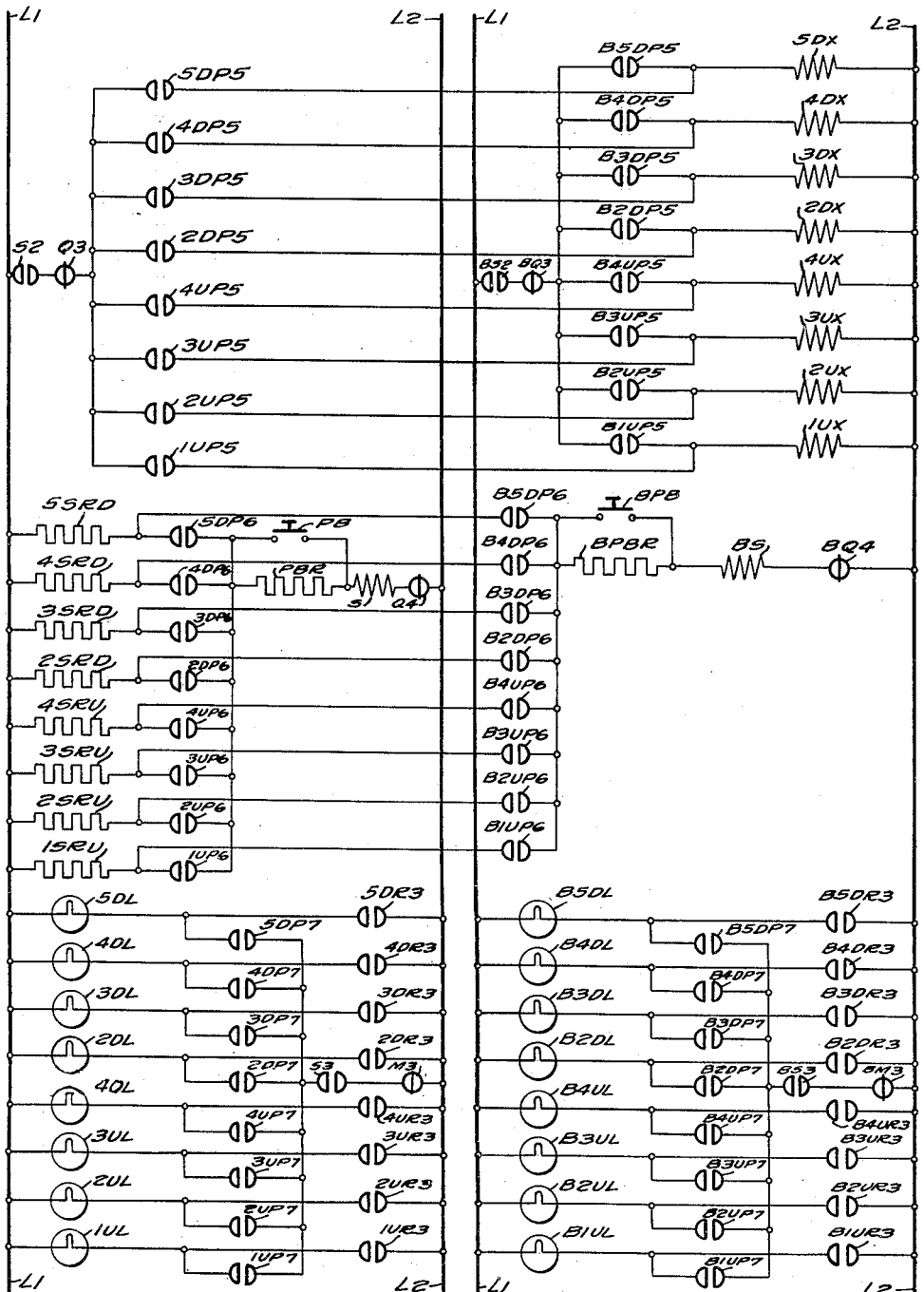

The upper part of Fig. 5 shows a series of common zoning relays, of which there is one up relay for each intermediate floor and the lower terminal floor, and a down relay for each intermediate floor and the upper terminal floor. The up zoning relays are designated 1UX, 2UX, 3UX and 4UX, and the down zoning relays are designated 2DX, 3DX, 4DX and 5DX. The common zoning relays respond directly to the positions of the respective cars of the bank, as illustrated by the parallel connected contacts of car position relays 1UP and B1UP; 2UP and B2UP, etc., of both cars A and B in the circuits thereof.

The zoning relays 1UX, 2DX etc., control the zoning circuits of the call storing relays 1UR, 2DR etc., (Fig. 5), are retarded in dropping out, by any suitable means, so that their contacts remain closed during the short time interval after one position relay such as 1UP opens, before the next succeeding position relay 2UP closes. For this purpose, the zoning relays 1UX, 2DX etc., may be provided with a short-circuited turn, as indicated diagrammatically in Fig. 12.

Referring further to Fig. 5, the car selecting relays S and BS, near the middle of the diagram, are provided to supplement the action of the common zoning relays under conditions where two or more cars are standing at the same floor. Relays S and BS respond directly to the positions of the corresponding cars, through contacts 5DP5, 4DP5, etc., associated with the car position relays. Both relays S and BS are connected in parallel relationship to a plurality of selective resistors 5SRD, 4SRU, etc. The arrangement is such that the selecting relays S and BS normally are energized, but are momentarily deenergized as the car passes transfer points between floors. The resistance values of the selective resistors 5SRD etc., are such that if two or more selecting relay circuits corresponding as to floor, are simultaneously completed, none of the selecting relays operate, or if one or more additional selecting relay circuits are completed corresponding to a floor for which a selecting relay circuit is already complete, such additional selecting relays do not operate. The selecting relay associated with the already complete circuit remains in the operated position, however. A manually operable dispatcher's button PB and BPB is associated with each selecting relay S and BS, respectively, for operation in the event that two or more cars are standing at the same landing with none of the selecting relays in operated condition. Operation of a dispatcher's button short-circuits a corresponding section of resistance PBR or BPBR, respectively, and causes operation of the selecting relay for that car.

As also shown in Fig. 5, near the bottom thereof, each car of the bank is provided with a set of floor lanterns individual to it, there being an up floor lantern for each of the intermediate floors, and the lower terminal floor, and a down floor lantern for each of the intermediate floors and the upper terminal floor. The floor lanterns for car A are designated 1UL, 2DL, etc., and the lanterns for car B are similarly designated but have a prefix B. Each floor lantern is arranged to be illuminated through either of two circuits, one of which is controlled by a corresponding call-storing relay contact, such as 5DR3, for the same floor, and the other of which is arranged to be controlled by a car position relay contact, such as 5DP7, for the same floor, a contact S3 of the selecting relay S and a contact M3 of the auxiliary control relay M. The former circuit causes the lighting of a floor lantern to occur as soon as a particular floor call is appropriated to one of the cars. The latter circuit causes a floor lantern to light at the time the car stops at the corresponding floor, in response, for example, to a call previously assigned to the other car.

Figure 6:
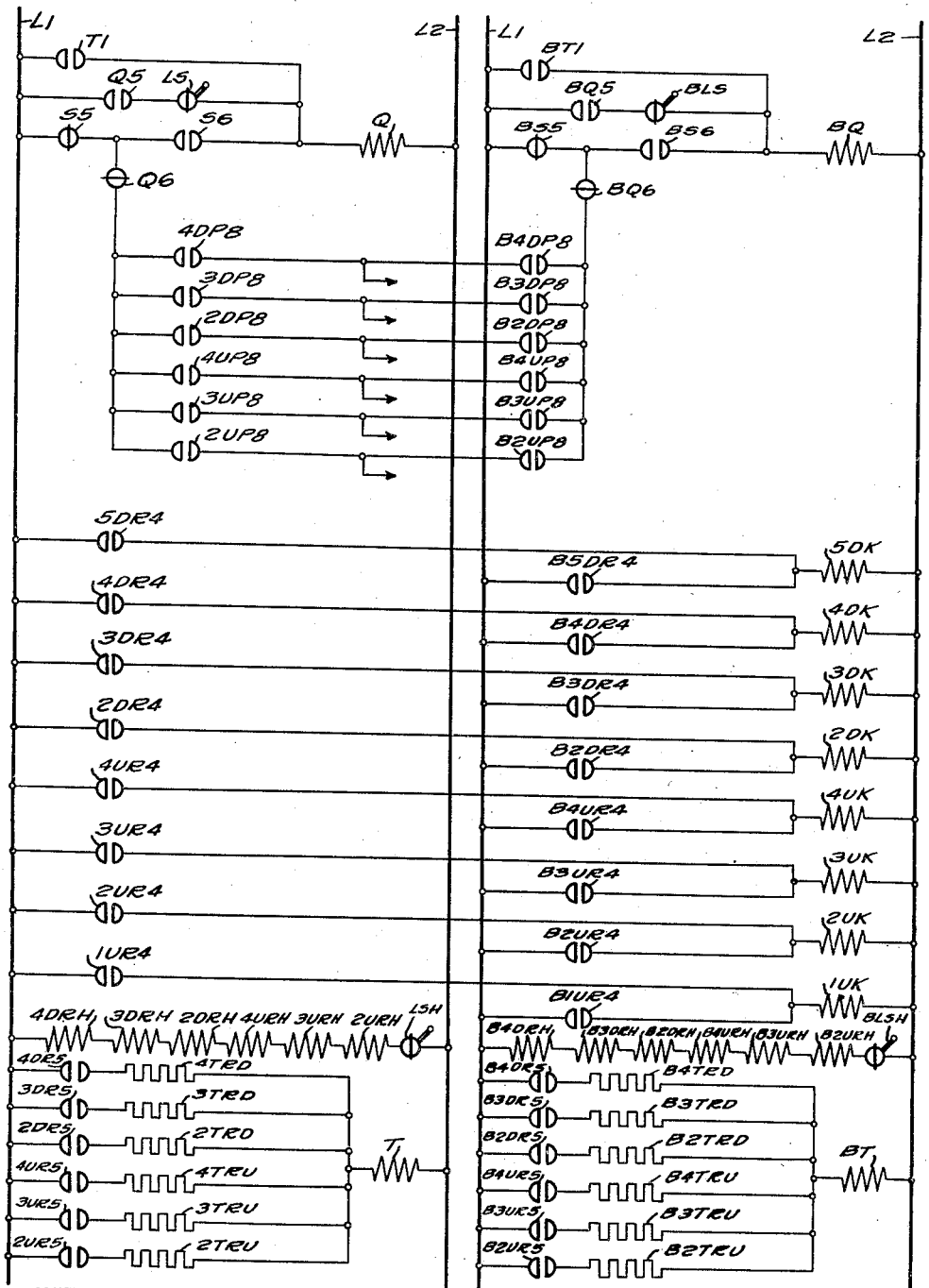

Referring to Fig. 6, each car is provided with a quota relay Q and BQ, respectively, which serves to remove the car from the zoning system and prevent the acceptance of further calls thereby, under either of two conditions. The first of these conditions is that the weighted total of calls assigned to the car equals a predetermined number, termed the car's quota. It has been found in practice that at certain floors of a building, more passengers usually enter a car during each stop, than at other floors. Floors at which the larger number of passengers enter may, therefore, be given a greater weight in determining the quota number than other floors at which a smaller number of passengers commonly enter a stopped car. For example, if approximately double the average number of prospective passengers enter a car stopped at the fourth floor, the latter floor may be given a weight of 2 as compared with other floors. If the car's quota is 3 stops, therefore, it may stop at any three floors except the fourth without filling its quota. However, if it stops at the fourth floor first, it may stop at only one other floor to fill its quota. The manner in which the various floors are weighted will be explained in connection with the totalizing relays T and BT.

The second condition which will cause operation of a quota relay Q or BQ is that the corresponding car has been overtaken by another car, travelling in the same direction.

The quota relays Q and BQ are each provided with holding circuits controlled by limit switches LS and BLS, respectively, controlled by suitable cams (not shown) so as to drop out the corresponding quota relay at the upper and lower limits of travel of the corresponding car.

A series of selectivity relays 1UK, 2UK, 3UK and 4UK, common to both cars, is provided for the up direction of travel, and a similar series 2DK, 3DK, 4DK and 5DK is provided for the down direction of travel. The selectivity relays 1UK, etc., are controlled by parallel contacts of the call storing relays 1UR, B1UR, etc., so as to operate in response to the operation of any call storing relay for the corresponding floor. The selectivity relays 1UK, 2UK, etc., serve to prevent the energization of any deenergized call storing relays 1UR, 2UR, etc., (Fig. 4), for any floor and direction of travel, when another call storing relay for the same floor and direction of travel is already energized.

The circuits of totalizing relays T and BT are shown near the bottom of Fig. 6. These relays have operating coils of relatively low resistance which are connected to a number of parallel branch circuits, each including a weighting resistor 4TRD, 3TRD, etc., and contacts 4DR5, 3DR5, etc., of the corresponding floor relays 4DR, 3DR, etc. The contacts 4DR5, 3DR5, etc., are different from the remaining contacts, are held closed by individual holding coils, upon operation of the main relay operating coil, and remain closed after the relay is deenergized, until the circuit of the holding coil is interrupted open. The holding coils for the contacts 4DR5, etc., are shown just above the circuits of relays T and BT, in Fig. 6. The holding coils 4DRH, 3DRH, etc., for car A are controlled by a limit switch LSH which is opened by suitable cams (not shown) at the upper and lower limits of travel of car A. The holding coils of car B are similarly controlled by a limit switch BLSH which opens at both limits of travel of car B.

Various auxiliaries which would be provided in a practical embodiment of the invention, but which have no direct bearing on the novel features of the system, have been omitted in order to simplify the disclosure. For example, some form of annunciator would be provided in both cars A and B for notifying the operator when up or down calls are registered by means of the hall buttons.

Description of operation

For convenience in the following description, the various relays and switches individual to car A and those common to all cars of the bank are identified as follows:

*Individual to car A:*

U—Up reversing switch
    D—Down reversing switch
    V—Speed switch
    E—Slowdown inductor switch
    F—Stopping inductor switch
    M—Auxiliary control relay
    G—Holding relay
    H—Stopping relay
    HC—Auxiliary stopping relay
    MSU—Up master switch contacts
    MSD—Down master switch contacts
    PB—Dispatcher's button
    Q—Quota relay
    S—Selecting relay
    T—Totalizing relay 1UP, 2UP, 3UP, 4UP —Up car position relays 2DP, 3DP, 4DP, 5DP —Down car position relays 1UR, 2UR, 3UR, 4UR —Up call storing relays 2DR, 3DR, 4DR, 5DR —Down call storing relays

*Common to all cars:*

1U, 2U, 3U, 4U —Up hall buttons 5D, 4D, 3D, 2D —Down hall buttons

1UC, 2UC, 3UC, 4UC —Up floor relays

2DC, 3DC, 4DC, 5DC —Down floor relays

1UX, 2UX, 3UX, 4UX —Up common zoning relays

1DX, 2DX, 3DX, 4DX —Down common zoning relays

1UK, 2UK, 3UK, 4UK —Up common selectivity relays

2DK, 3DK, 4DK, 5DK —Down common selectivity relays

Operating sequence

In order to illustrate the novel features of operation of the present system, the following operating sequence will be described in connection with the apparatus shown: With both cars standing at the first floor, car A having arrived there first, it will be assumed that a prospective passenger at the fifth floor presses the fifth floor hall button, thereby registering a down call for the fifth floor; that car A is started upward, arrives at the fifth floor and stops; that down calls are then registered at the second and third floors; that car A is started downward, arrives at the third floor and stops; that car A is delayed indefinitely at the third floor; that a down call for the fourth floor is subsequently registered; that car B starts upward from the lower terminal, arrives at the fourth floor, stops and is started downward; and that car B passes car A at the third floor, and stops at the second floor answering the second floor call previously assigned to car A.

Referring to Fig. 4, as car A is standing at the first floor, having arrived from the downward direction, the brush $b$ of the corresponding floor selector mechanism is in contact with the segment $1b$, thereby completing a circuit for the up position relay IUP of car A. A similar circuit is completed by means of the brush B$b$ of the car B, and the position relays IUP and BIUP are, accordingly, closed.

Referring to Fig. 5, the contacts IUP6 of car position relay IUP have completed a circuit for the selecting relay S, which may be traced as follows:

L1; ISRU; IUP6; PBR; S; Q4; L2.

In response to completion of this circuit the selecting relay S is closed. A similar circuit for relay BS has been completed, by means of the contacts BIUP6 of the up position relay BIUP of car B, but, inasmuch as the position relay IUP closed first, the voltage initially applied to the operating coil of the selecting relay BS was insufficient to cause closure of the relay. The selecting relay S is, accordingly, closed, whereas the corresponding selecting relay BS of the car B is open. As shown in the upper part of Fig. 5, the contacts S2 of the selecting relay S being closed, a circuit is completed for the common zoning relay IUX for both cars. This circuit may be traced as follows:

L1; S2; Q3; IUP5; IUX; L2.

The common zoning relay IUX is, accordingly, closed.

Registration of hall call

The prospective passenger at the fifth floor presses the hall button 5D (Fig. 3), thereby completing a circuit for the operating coil of the floor relay 5DC, which circuit will be obvious from the diagram. In response to completion of this circuit, the floor relay 5DC closes, completing a holding circuit for itself by means of its contacts 5DC2; completing a circuit for the call storing relay 5DR (Fig. 4) by means of its contacts 5DC3; and closing its contacts 5DC4 (Fig. 4) in the circuit of the call storing relay B5DR. Inasmuch as the selecting relay BS is open, its open contacts BS1 prevent closure of the call storing relay B5DR, and the closure of the contacts 5DC4 has no effect at this time. The closing circuit for the call storing relay 5DR (Fig. 4) may be traced as follows:

L1; 5DC3; 5DR; 5DK1; 5DX1; 4UX1; 3UX1; 2UX1; IUP4; Q2; S1; L2.

In response to completion of this circuit, the call storing relay 5DR closes, completing a circuit for the hall lantern 5DL, located above the door for car A at the fifth floor; establishing a holding circuit for itself by means of its contacts 5DR2; and completing a circuit for the selectivity relay 5DK (Fig. 6) for the corresponding floor.

The circuit for the floor lantern 5DL, completed upon closure of call storing relay 5DR, is shown near the bottom of Fig. 5, and may be traced as follows:

L1; 5DL; 5DR3; L2.

The circuit for the common selectivity relay 5DK may be traced as follows (Fig. 6):

L1; IUR4; IUK; L2.

In response to completion of its closing circuit, traced above, the common selectivity relay 5DK closes. The selectivity relay 5DK, in closing, opens the circuit of the call storing relay B5DR by means of its back contacts 5DK2, thereby preventing closure of the call storing relay B5DR for car B; and also opens its contacts 5DK1 in the closing circuit of the call storing relay 5DR. As the call storing relay 5DR has closed and established a holding circuit for itself independent of the contacts 5DK1, the opening of the latter contacts has no effect.

Starting of car

As the operator of car A has received a start signal on the car annunciator (not shown), he moves the handle of the car switch MS in a direction to cause the car to start upward, and as soon as the car starts, returns the car switch handle to its central position. In response to movement of the car switch handle, a circuit is completed for the up reversing switch U and the auxiliary control relay M. The latter two switches, accordingly, close.

The up reversing switch U, in closing, establishes a circuit for the release coil of the brake 14 by means of its contacts U1; completes an energizing circuit for the generator shunt field winding 13 by means of its contacts U2, U3; establishes a holding circuit for itself by means of its contacts U4; and completes a circuit for the speed switch V by means of its contacts U5.

The auxiliary control relay M, in closing, opens its contacts M2 (Fig. 2) in the circuit of the floor relay cancellation coils 5DCN, etc., and partly completes circuits for the holding relay G and the inductor switches E, F (Fig. 2) by means of its contacts M1.

As the brake 14 is now released, and the separately excited field winding 13 of the generator 11 is energized, the motor 10 starts, and car A is moved in the upward direction. The closure of the speed switch V increases the voltage impressed on the generator field winding 13, and the motor 10 gradually accelerates to full speed.

Operation at full speed

As car A starts upward from the first floor, the carriage 22 of the floor selector 20 (Fig. 1) partially rotates, thereby causing the brush $b$ to disengage its cooperating row of segments, and causing engagement of brush $a$ with its row of cooperating segments.

Shortly after car A leaves the first floor, the brush $a$ disengages the contact segment $1a$, and the position relay 1UP (Fig. 4) drops out. The position relay 1UP, in dropping out interrupts the circuit of the selecting relay S, momentarily, and also opens the circuit of the common zoning relay 1UX. As the zoning relay 1UX is time delayed in dropping out, its contacts 1UX1 and 1UX2 do not immediately open.

As car A approaches the second floor, the brush $b$ engages the segment $2a$, thereby completing a circuit for the second floor position relay 2UP. The latter relay, accordingly closes, again establishing the circuit for the selecting relay S, and establishing a circuit for the common zoning relay 2UX for the second floor. As these circuits are similar to others already traced, it will be unnecessary to trace them in detail.

As the circuits of selecting relay S and zoning relay 2UX are complete, the former recloses and the zoning relay 2UX operates to open its contacts 2UX1 and 2UX2 (Fig. 4) in the circuits of the call storing relays 1UP, etc. Shortly after operation of the zoning relay 2UX, the delayed contacts 1UX1 and 1UX2 of zoning relay 1UX reclose.

Similarly, as car A passes the third and fourth floors in its upward movement, the up position relays 3UP and 4UP momentarily close, in each case establishing momentarily energizing circuits for the selecting relay S and causing sequential operation of the common zoning relays 3UX and 4UX.

*Stopping of car in response to hall call*

As car A approaches the fifth floor, the circuit of the car position relay 4UP is interrupted by the separation of the brush $b$ from the segment $4b$, and the position relay 4UP drops out. The latter relay, in dropping out interrupts the circuit of the selecting relay S, causing the latter to drop out, and also interrupts the circuit of the zoning relay 4UX, causing deenergization of the latter. As the zoning relay 4UX is delayed in dropping out, a time interval elapses before reclosure of its contacts.

Further movement of car A toward the fifth floor establishes a circuit for the car position relay 5DP, and the latter closes, establishing a circuit for the common zoning relay 5DX for the fifth floor; establishing a circuit for the stopping relay H (Fig. 2); partly completing a circuit for the call storing relay 5DR (Fig. 4) by means of its contacts 5DP4; partly completing a circuit for holding the floor lantern 5DL in energized condition after the call storing relay 5DR drops out; and partly completes a circuit for the deenergizing coil 5DCN (Fig. 3) of the floor relay 5DC.

In response to completion of its circuit by the car position relay 5DP, the common zoning relay 5DX for the fifth floor closes, thereby changing the distribution of floors in the zones of the cars A and B, by means of its contacts 5DX1 and 5DX2 shown in Fig. 4.

In response to completion of its energizing circuit by the position relay 5DP, the stopping relay H (Fig. 2) closes to complete a circuit by means of its contacts H1 for the holding relay G and the slow-down inductor switch E. The circuit for the stopping inductor switch F is maintained open at this time by contacts V2 of the speed switch V. As the circuit of holding relay G is complete, the latter relay closes and locks in, maintaining the operating coils of the inductor switches E and F in energized condition until car A is brought to rest.

As car A further approaches the fifth floor, the slow-down inductor switch E passes the slow-down inductor plate for the fifth floor, and the contacts E1 separate causing the speed switch V to drop out. The speed switch V, in dropping out, reinserts resistance in series with the generator field winding 13, thereby causing the motor 10 to decelerate.

Upon further movement of car A toward the fifth floor, the inductor switch F passes the stop inductor plate for the fifth floor, and the contacts F1 open, interrupting the circuit of the up reversing switch U and the auxiliary control relay M.

In response to the opening of its circuit by the contacts E1, the up reversing switch U drops out, interrupting the circuit of the release coil of brake 14 by means of its contacts U1; interrupting the circuit of the generator field winding 13 by means of its contacts U2, U3; opening its own holding circuit by means of its contacts U4; and opening the circuit of speed switch V by means of its contacts U5.

Similarly, the auxiliary control relay M drops out in response to the opening of contacts E1 of the inductor switch E. The auxiliary control relay M, in dropping out, completes a circuit for the deenergizing coil 5DCN of the floor relay 5DC for the fifth floor (Fig. 3) by means of its contacts M2; completes a circuit for the floor lantern 5DL (Fig. 5) by means of its contacts M3; and opens the circuit common to the holding relay G and the inductor switches E and F (Fig. 2) by means of its contacts M1. As the circuit of the speed switch V is open, and the circuit of the demagnetizing coil 5DCN of the floor relay 5DC is now complete, the speed switch V and the floor relay 5DC drop out.

As the generator field winding 13 is now disconnected, and the brake 14 is applied by means of its spring (not shown), the motor 10 is brought to rest with the elevator car A at the fifth floor.

As mentioned above, the floor relay 5DC is caused to drop out by the energization of its demagnetizing coil 5DCN. The floor relay 5DC, in dropping out, opens its contacts 5DC2 in its own holding circuit; opens the circuit of the call storing relay 5DR (Fig. 4) by means of its contacts 5DC3; and opens its contacts 5DC4 in the circuit of the call storing relay B5DR (Fig. 4).

As the floor relay 5DC, in dropping out interrupted the circuit of the call storing relay 5DR, the latter drops out. The call storing relay 5DR, in dropping out, interrupts the circuit of the selectivity relay 5K; opens its contacts in the circuit of the floor lantern 5DL; and opens its contacts 5DR2 in its own holding circuit. As the circuit of the floor lantern 5DL remains complete through the contacts 5DP7, S3 and M3, however, the floor lantern 5DL remains illuminated, notwithstanding the opening of call storing relay 5DR.

Car A is now standing at the fifth floor, car B is standing at the first floor, and relays 1UP, 5DP, 1UX, 5DX, S and BS are closed.

It is assumed that prospective passengers at the second and third floors now press the push buttons 2D and 3D, respectively, in order to register down calls for the corresponding floors. Upon operation of the push button 2D, a circuit is completed for the floor relay 2DC (Fig. 3), and the latter closes locking itself in by means of its contacts 2UC2. The floor relay 2DC, also completes energizing circuits for the call storing relay 2DR and for the selectivity relay 2DK, in a manner similar to that described in connection with the operation of the floor relay 5DC. Inasmuch as the floor relay 2DC corresponds to an intermediate floor, it has an additional function to that of the terminal relays such as 5DC. This function is performed by the contacts 2DC1 in partially completing a circuit for the auxiliary stopping relay HC (Fig. 2) of car A, and in partially completing a similar circuit for the auxiliary stopping relay BHC of car B. These two circuits, however, are open at the contacts 2DP2 and B2DP2 of the car position relay 2DP and B2DP, respectively. These circuits serve to stop car B in response to calls assigned to car A, and to stop car A in response to calls assigned to car B, under certain conditions, as will be more fully explained below.

Upon operation of the push button 3D at the third floor, a circuit for the floor relay 3DC is completed, and the latter relay closes, locking itself in and completing circuits for the call storing relay 3DR and the selectivity relay 3DK for the corresponding floor.

The relays 2DR and 3DR for the intermediate floors have a function not performed by the corresponding relays for the terminal floors, in that each completes a path through one of the loading resistors 3TRD and 2TRD (Fig. 6) for the totalizing relay T. Parallel branches in the circuit of the totalizing relay T are not included for the terminal call storing relays 5DR, IUR, etc., for the reason that each car must stop at the terminal floors whenever operated thereto, and registered calls for such floors do not increase the number of stops made. It is, accordingly, unnecessary to include such calls in the car's quota.

In response to the down calls registered at the third and second floors, the operator of car A starts the latter car downward by movement of the master switch, so that the central segment MS thereof engages the down contact MSD. As soon as the car commences to move in the downward direction, the operator centers the car switch, as heretofore mentioned in connection with upward operation of the car.

Upon engagement of the car switch segments MS with the contact MSD, a circuit for the down reversing switch D and the auxiliary control relay M is completed. The down reversing switch D, accordingly, closes to connect the generator field winding 13 to the supply conductors L1 and L2; to lock itself in; to complete a circuit for the speed switch V; and to establish a circuit for the release winding of the brake 14, in a manner which will be readily understood from the preceding description. The auxiliary control relay M again closes, opening the circuit of the floor relay cancellation coils 5DCN, etc., and partly completing a circuit for the holding relay G and the inductor switches E and F, as heretofore described.

The motor 10 now starts to rotate in the proper direction to move car A downward in the hatchway, and as the circuit of speed switch V is complete, the latter closes to establish high speed motor connections, and the motor 10 accelerates to full speed.

As car A leaves the fifth floor, moving downward, the car position relay 5DP drops out, momentarily interrupting the circuit of the selecting relay S, and dropping out the zoning relay 5UX for the fifth floor as will be readily understood from the corresponding operation in the upward travel of car A, heretofore described.

As car A passes the fourth floor, in its downward movement, the car position relay 4DP, and the common zone relay 4UX for the fourth floor, and the selecting relay S momentarily close and open in the manner heretofore described.

As car A approaches the third floor, the car position relay 3DP closes, causing closure of its contacts 3DP4, closing circuits of the call storing relays 5DR, 4DR, etc., of Fig. 4. The car position relay 3DP in closing also completes a circuit for the common zoning relay 3DX for the third floor; completes a circuit for maintaining the energization of the floor lantern 3DL at the third floor after interruption of its circuit by the opening of call storing relay 3DR; completes a circuit for the stopping relay H; partly completes a circuit for the demagnetizing coil 3DCN of the floor relay 3DC; and partly completes a common circuit connecting the operating coils of the quota relays Q and BQ (see Fig. 6).

As the circuit of the common zoning relay 3DX is completed, the latter relay closes and transfers the zoning connections of the cars A and B so that the fourth floor is now included in the zone of car B.

In response to completion of its circuit, as described above, the stopping relay H closes completing a circuit for the holding relay G and the magnetizing coil of the inductor switch F, and partially completing a circuit for the magnetizing coil of the inductor switch E. The holding relay G, accordingly, closes and locks itself in as heretofore described, establishing an energizing circuit for the inductor switches E and F until the car A is brought to rest. The inductor switches E and F now bring car A to rest at the third floor in the manner heretofore described.

It is assumed that car A is delayed indefinitely at the third floor. Meanwhile, a down call is registered for the fourth floor, and as the fourth floor is no longer in the zone of car A, but is now included in the zone of car B, a start signal is given to the operator of car B.

As the operating sequence has so far been described, car A is standing at the third floor and car B is standing at the fourth floor. Car position relays 3DP and 4DP are closed, as are the selecting relays S and BS. The zoning relays 4DX and 3DX are also closed, and the down call at the second floor remains assigned to car A. The call storing relay 2DR is also closed, and the floor lantern 2DL at the second floor above the door corresponding to car A is illuminated.

As mentioned above, car B has received a starting signal, and in response thereto the operator starts the latter in the upward direction and the car runs to the top terminal where it is automatically decelerated and stopped. As the down call at the fourth floor remains unanswered, the operator of car B starts the latter in the downward direction and the car is automatically decelerated and stopped at the fourth floor in a manner which will be clear from the above described operation of car A. After the prospective passenger at the fourth floor has boarded car B, the operator starts the latter car in the down direction by movement of the car switch segment BMS so as to engage the contact BMSD. Upon engagement of the contact segment BMS with the contact BMSD, a circuit is completed for the down reversing switch BD and the auxiliary control relay BM of car B.

The down reversing switch BD, accordingly, closes to connect the field winding B13 of generator B11 to the supply conductors L1 and L2; to establish a holding circuit for itself; to complete a circuit for the speed switch BV; and to release the brake B14 in a manner which will be understood from the above described operation of car A.

The auxiliary control relay BM also closes, opening the circuit of the floor relay cancellation coils B5DCN, etc., and partly completes a circuit for the holding relay BG and the inductor switches BE and BF. The motor B10, accordingly, starts in the direction to move car B downward, and the speed switch BV closes to accelerate the motor B10 to full speed in the downward direction.

As car B leaves the fourth floor, moving downward, the car position relay B4DP drops out, momentarily interrupting the circuit of the selecting relay BS, and dropping out the common zoning relay 4DX.

*Passing of cars prepared to move in the same direction*

As car B approaches the third floor, where car A is now standing, the car position relay B3DP closes, causing closure of its contacts B3DP4 in the circuit of call storing relays B5DR, B4DR, etc.; and completing a circuit for the quota relay Q for the car A. The car position relay B3DP in closing, also partly completes a circuit for the floor lantern B3DL; partly completes a circuit for the demagnetization coil B3DCN of the floor relay B3DC; partly completes a circuit for the stopping relay BH; partly completes a circuit for the auxiliary stopping relay BHC; completes a circuit for the selecting relay BS; and closes its contacts B3DP6 in the circuit of the common zoning relay 3DX. As the zoning relay 3DX is already closed, the closure of the latter contacts has no effect. The completion of the circuit of the selecting relay BS is also without effect as the voltage applied to the operating winding of the latter is insufficient to effect relay closure.

It was mentioned above that closure of the relay B3DP established a circuit for the quota relay Q of car A. This circuit may be traced as follows (Fig. 6):

From the right-hand supply conductor L1; BS5; BQ6; B3DP8; 3DP8; Q6; S6; Q; to the left-hand supply conductor L2.

Upon completion of its energizing circuit as traced above, the quota relay Q of car A closes, establishing a holding circuit for itself by means of its contacts Q5; opening the circuit of the zoning relay 3DX (Fig. 5); opening the circuit of the selecting relay S; opening contacts in the circuit of the stopping relay HC; and opening contacts in the closing circuit of the call storing relays 5DR; 4DR, etc. The zoning relay 3DX, however, does not immediately open because of its time delay.

In response to interruption of its circuit by the quota relay Q, the selecting relay S drops out. The latter, in dropping out, causes the selecting relay BS for car B to close because of the increased voltage available upon interruption of the circuit of relay S. The relay S, in dropping out, also opens contacts in the circuit of the common zoning relay 3DX; opens contacts in the circuit of the floor lanterns 3DL, etc., (Fig. 5); and also opens its contacts S6 in parallel to the holding circuit of the quota relay Q. The back contacts S5 of the selecting relay S close at this time, and the front contacts S1 in the circuit of the call storing relays 5DR, etc., open.

As mentioned above, the selecting relay BS closes because of the increased voltage available upon the opening of the selecting relay S. The selecting relay BS, in closing, re-establishes the circuit of the common zoning relay 3DX; closes contacts BS3 in the circuit of the floor lanterns B5DL, etc., (Fig. 5); opens contacts BS5 in the circuit of the quota relay BQ (Fig. 6); and closes contacts BS6 in the circuit of the quota relay BQ.

As car B leaves the third floor moving downward, the position relay B3DP drops out causing momentary deenergization of the selecting relay BS, and interrupting the circuit of the zoning relay 3DX. The interruption of the circuit of the selecting relay BS causes a higher voltage to appear across the energizing coil of the selecting relay S, but the latter cannot reclose as the quota relay Q is locked in. Although the position relay 3DP is closed, the common zoning relay 3DX for the third floor does not reclose at this time as the selecting relay S is open. Car A is, accordingly, removed from the zoning system and its zone is transferred to the next following car whose quota relay is unoperated. In the case described, only car B is in condition to receive the transferred zone, and, accordingly, appropriates the zone of car A which is added to its own zone.

As car B approaches the second floor moving downward, the car position relay B2DP closes, closing its contacts B2DP4 in the closing circuit of the call storing relays B5DR, etc.; closing its contacts B2DP8 in the common circuits of quota relays Q and BQ, completing a circuit for the selecting relay BS; closing its contacts B2DP6 in the circuit of the zoning relay 2DX; closing its contacts B2DP7 in the circuit of the floor lantern B2DL; closing its contacts B2DP1 in the circuit of the stopping relay BH; and completing a circuit for the auxiliary stopping relay BHC.

Upon completion of its circuit by the closing of car position relay B2DP, the selecting relay BS closes to complete a circuit for the common zoning relay 2DX; to open its back contacts BS5 in the circuit of the quota relay BQ; to close its front contacts BS6 in the circuit of the quota relay BQ; and to close its contacts BS1 in the circuit of the call storing relay B5DR, etc.

In response to completion of its circuit by the selecting relay BS, the common zoning relay 2DX for the second floor closes. Similarly, in response to the closure of car position relay B2DP, the auxiliary stopping relay BHC closes and completes a circuit for the stopping relay BH. The latter circuit may be traced as follows:

L1; 2DC1; B2DP2; BHC; BQ1; L2.

The stopping relay BH, accordingly, closes and completes a circuit for the holding relay BG and the inductor switch BF and partly completes a circuit for the energizing coil of the inductor switch BE.

As the circuit of stopping relay BG is complete, the latter closes and establishes a holding circuit for itself and for the inductor switches BE and BF.

As car B further approaches the second floor, the contacts BE2 of inductor relay BE open, causing the speed relay BV to drop out and the motor B10 to decelerate. Further movement of car B toward the second floor brings the inductor switch BE in a position to effect the opening of contacts BE2, and upon operation of the latter, the circuits of the down reversing switch BD and the auxiliary control relay BM of car B are interrupted.

Upon interruption of the circuit of down reversing switch BD, the latter drops out, disconnecting the generator field winding B13; deenergizing the release winding of brake B14; opening contacts in its own holding circuit; and interrupting the circuit of the speed relay BV. The auxiliary control relay BM also drops out, completing a circuit for the demagnetizing coil 2DCN of the floor relay 2DC; and opening the circuit of the holding relay BG.

Car B is, accordingly, brought to rest at the second floor. The energization of the demagnetizing coil 2DCN of the floor relay 2DC causes the latter to drop out, thereby effecting the opening of its own holding circuit; the interruption of the circuit of call storing relay 2DR; and the interruption of the circuit of stopping relay BHC. The floor relay 2DC, in dropping out, also opens its contacts 2DC4 in the circuit of the call storing relay B2DR.

As the circuit of call storing relay 2DR is open the latter relay drops out to interrupt the circuit of the common selectivity relay 2DK; to deenergize the floor lantern 2DL; to open contacts in the circuit of the stopping relay BH; to open contacts in the circuit of the totalizing relay BT; and to open contacts in its own holding circuit.

The relays BG, BHC and 2DK, accordingly, drop out, restoring the relay apparatus of car B to condition for further response to the car switch BMS.

In the operation described above, it will be noted that when car A had the down zone which included the second floor, and a down call was registered at the second floor, this call was assigned to car A by the closure of the corresponding call storing relay 2DR. However, upon car B passing car A in the downward direction, a stopping circuit effective to cause the stopping of car B at the second floor was set up, and thereafter car B was automatically decelerated and stopped at the second floor. Upon stopping at the second floor, the floor lantern B2DL of car B was illuminated, and the coil for the second floor previously registered on the call storing relay 2DR of car A was automatically cancelled.

Although the operation of quota relay Q has been described only for the condition of one car passing another, it will be apparent that the quota relays Q or QB may be closed in response to the condition that the corresponding car A or B is assigned a number of hall calls equal to or in excess of its quota. Referring to Fig. 6, upon receipt by either car of its quota of calls, the corresponding totalizing relay T or BT closes to complete a circuit for the corresponding quota relay Q or BQ.

I do not intend that the present invention shall be restricted to the specific structural details, arrangement of parts, or circuit connections herein set forth, as various modifications thereof may be effective without departing from the spirit and scope of my invention. I desire, therefore, that only such limitations shall be imposed as indicated in the appended claims.

I claim as my invention:

1. In an elevator system having a group of cars operable past a plurality of floors, a switch means common to all of said cars for each floor, for establishing calls for service for the corresponding floor; motive apparatus individual to each of said cars; stopping means for each car for controlling the corresponding motive apparatus to cause the car to stop at any selected one of said floors; common means for all of said cars for causing operation of any of said stopping means to effect a stop of the corresponding car upon approach of said corresponding car, in proper condition to stop, to a floor for which said switch means is operated; and individual control means for a selected one of said cars corresponding to a predetermined floor, said individual control means being responsive to operation of said switch means for said predetermined floor to cause operation of said stopping means of said selected car upon approach of said selected car to said predetermined floor.

2. In an elevator system having a group of cars operable past a plurality of floors, a switch means common to all of said cars for each floor, for establishing calls for service for the corresponding floor; motive apparatus individual to each of said cars; stopping means for each car for controlling the corresponding motive apparatus to cause the car to stop at any selected one of said floors; common means for all of said cars for causing operation of any of said stopping means to effect a stop of the corresponding car upon approach of said corresponding car, in proper condition to stop, to a floor for which said switch means is operated; means for assigning floors, having the corresponding switch means operated, to individual cars of said group; and means individual to said cars, additional to said common means, for causing operation of the corresponding stopping means upon approach of the car to a floor assigned thereto.

3. In an elevator system having a group of cars operable past a plurality of floors, a switch means common to all of said cars for each floor, for establishing calls for service for the corresponding floor; motive apparatus individual to each of said cars; stopping means for each car for controlling the corresponding motive apparatus to cause the car to stop at any selected one of said floors; common means for all of said cars for causing operation of any of said stopping means to effect a stop of the corresponding car upon approach of said corresponding car, in proper condition to stop, to a floor for which said switch means is operated; means for assigning floors, having the corresponding switch means operated, to individual cars of said group; individual means for said cars for causing operation of the corresponding stopping means upon approach of the car to a floor assigned thereto; and means, effective when operated, to prevent control of a selected one of said stopping means by said common means but to permit control of said stopping means by the corresponding individual means.

4. In an elevator system having a group of cars operable past a plurality of floors, motive apparatus individual to each of said cars; stopping means individual to each car for controlling said motive apparatus of the corresponding car to cause the car to stop at any of said floors; common switch means for registering desired stops at any selected one of said floors; a signal element individual to each car for each floor; means responsive to operation of said common switch means for preparing all of said stopping means for stops of the associated cars at the corresponding floor, and for immediately operating a single signal element corresponding to the floor at which a stop is to be made, said single signal element being individual to a selected one of said cars;

and means responsive to an operation of the stopping means of a different car of said group in bringing said different car to a stop at the floor at which a stop is to be made in response to said switch means, for operating the signal element individual to said different car for the corresponding floor.

5. In an elevator system having a group of cars operable past a plurality of floors, motive apparatus individual to each of said cars; stopping means individual to each car for controlling said motive apparatus of the corresponding car to cause the car to stop at any of said floors; common switch means for registering desired stops at any selected one of said floors; a signal element individual to each car for each floor; means responsive to operation of said common switch means for preparing all of said stopping means for stops of the associated cars at the corresponding floor, and for immediately operating a single signal element corresponding to the floor at which a stop is to be made, said single signal element being individual to a selected one of said cars; and means responsive to an operation of the stopping means of a different car of said group in bringing said different car to a stop at the floor at which a stop is to be made in response to said switch means, for rendering the signal element individual to said selected car for the corresponding floor ineffective.

6. In an elevator system having a group of cars operable past a plurality of floors, motive apparatus individual to each of said cars; stopping means individual to each car for controlling said motive apparatus of the corresponding car to cause the car to stop at any of said floors; common switch means for registering desired stops at any selected one of said floors; a signal element individual to each car for each floor; means responsive to operation of said common switch means for preparing all of said stopping means for stops of the associated cars at the corresponding floor, and for immediately operating a single signal element corresponding to the floor at which a stop is to be made, said single signal element being individual to a selected one of said cars; and means responsive to an operation of the stopping means of a different car of said group in bringing said different car to a stop at the floor at which a stop is to be made in response to said switch means for operating the signal element individual to said different car for the corresponding floor and for rendering the signal element individual to said selected car for the corresponding floor ineffective.

7. In an elevator system having a group of cars operable past a plurality of floors, motive apparatus individual to each of said cars; stopping means individual to each car for controlling said motive apparatus of the corresponding car to cause the car to stop at any selected one of said floors; a floor switch common to all of said cars for each floor for each direction of car travel; a floor lantern individual to each car for each floor for each direction of car travel; means responsive to operation of any of said floor switches for preparing all of said stopping means for stops of the associated car at the corresponding floor in the corresponding direction of car travel and for immediately illuminating a single floor lantern for the corresponding floor and the corresponding direction of car travel, said selected floor lantern being individual to a selected one of said cars; and means responsive to an operation of the stopping means of a different car of said group in bringing said different car to a stop at said corresponding floor in said corresponding direction of car travel for illuminating said floor lantern individual to said different car for said corresponding floor and said corresponding direction of car travel.

8. In an elevator system having a group of cars operable past a plurality of floors, motive apparatus individual to each of said cars; stopping means individual to each car for controlling said motive apparatus of the corresponding car to cause the car to stop at any selected one of said floors; a floor switch common to all of said cars for each floor for each direction of car travel; a floor lantern individual to each car for each floor for each direction of car travel; means responsive to operation of any of said floor switches for preparing all of said stopping means for stops of the associated car at the corresponding floor in the corresponding direction of car travel and for immediately illuminating a single floor lantern for the corresponding floor and the corresponding direction of car travel, said selected floor lantern being individual to a selected one of said cars; and means responsive to an operation of the stopping means of a different car of said group in bringing said different car to a stop at said corresponding floor in said corresponding direction of car travel for extinguishing said floor lantern individual to said selected car for said corresponding direction of car travel.

9. In an elevator system having a group of cars operable past a plurality of floors, motive apparatus individual to each of said cars; stopping means individual to each car for controlling said motive apparatus of the corresponding car to cause the car to stop at any selected one of said floors; a floor switch common to all of said cars for each floor for each direction of car travel; a floor lantern individual to each car for each floor for each direction of car travel; means responsive to operation of any of said floor switches for preparing all of said stopping means for stops of the associated car at the corresponding floor in the corresponding direction of car travel and for immediately illuminating a single floor lantern for the corresponding floor and the corresponding direction of car travel, said selected floor lantern being individual to a selected one of said cars; and means responsive to an operation of the stopping means of a different car of said group in bringing said different car to a stop at said corresponding floor in said corresponding direction of car travel for illuminating said floor lantern individual to said different car for said corresponding floor and said corresponding direction of car travel, and for extinguishing said floor lantern individual to said selected car for said corresponding floor and said corresponding direction of car travel.

10. In an elevator system having a group of cars operable past a plurality of floors; call storing means for each car and each floor effective to immediately assign each desired stop at any of said floors to an individual one of said cars; motive apparatus individual to each of said cars; individual stopping means for each car responsive to the corresponding call storing means for controlling the corresponding motive apparatus to cause the car to stop at the floors for which stops are recorded; means for controlling said call storing means to limit the number of stops assigned to an individual car; and common stopping means, additional to said individual stopping means, for all of said cars as a group, said common stopping means comprising means for causing the first car of said group, which attains a more suitable position and condition than the others, to stop at a floor for which any of said call storing means has recorded a desired stop.

11. In an elevator system having a group of cars operable past a plurality of floors; call storing means for each car for recording desired stops of the corresponding car at any of said floors; a common switch means for each floor for establishing calls for service for the corresponding floor; means responsive to operation of any of said switch means for individually operating a single one of said call storing means to immediately select and record a desired stop of a selected car at the calling floor, motive apparatus individual to each of said cars; stopping means for each car responsive to the corresponding call storing means for controlling the corresponding motive apparatus to cause the car to stop at the floors for which stops are recorded; means for controlling said call storing means to limit the number of stops assigned to an individual car; and common stopping means for all of said cars as a group, comprising means for causing the first car of said group which attains a more suitable position and condition than the others, to stop at a floor for which the corresponding switch means has been operated.

12. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; means for controlling said call storing means to limit the number of stops assigned to an individual car; common stopping means for all of said cars as a group, comprising means for causing the first car of said group, which attains a more suitable position and condition than the others, to stop at a floor for which any of said call storing means has recorded a desired stop; and means effective upon stopping of any of said cars at a floor for restoring said call storing means for the corresponding floor to non-operated condition.

13. In an elevator system having a group of cars operable past a plurality of floors; call storing means for each car and each floor effective to assign each desired stop at any of said floors to an individual one of said cars; a common switch means for each floor for establishing calls for service for the corresponding floor; means responsive to operation of any of said switch means for operating one of said call storing means to immediately select and record a desired stop of a selected car at the calling floor; motive apparatus individual to each of said cars; stopping means for each car responsive to the corresponding call storing means for controlling the corresponding motive apparatus to cause the car to stop at the floors for which stops are recorded; means for controlling said call storing means to limit the number of stops assigned to an individual car; common stopping means for all of said cars as a group comprising means for causing the first car of said group which attains a more suitable position and condition than the others to stop at a floor for which the corresponding switch means is operated; and means effective upon stopping of any of said cars at a floor for restoring said call storing means and said common switch means for the corresponding floor to non-operated condition.

14. In an elevator system having a group of cars operable past a plurality of floors, call storing means for each car for recording desired stops of the corresponding car at any of said floors; limiting means for controlling said call storing means to restrict the number of stops assigned to the individual cars; and means effective in the event that a selected car, advancing from the rear of a different car passes a predetermined relative position with reference to said different car, for causing operation of said limiting means to restrict the assignment of calls to said different car.

15. In an elevator system having a group of cars operable past a plurality of floors, call storing means for each car for recording desired stops of the corresponding car at any of said floors; individual quota means for said cars, each of said quota means being effective to limit the number of stops assigned to the corresponding car; and means effective in the event that a selected car, advancing from the rear of a different car passes a predetermined relative position with reference to said different car, for causing operation of said quota means for said different car to prevent the assignment of further calls thereto.

16. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; limiting means for controlling said call storing means to restrict the number of stops assigned to the individual cars; and means effective in the event that a selected car, advancing from the rear of a different car, passes a predetermined relative position with reference to said different car, for causing said selected car to stop in response to a recorded stop of said different car.

17. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; limiting means for controlling said call storing means to restrict the number of stops assigned to the individual cars; and means effective in the event that a selected car, advancing from the rear of a different car, passes a predetermined relative position with reference to said different car for causing said selected car to stop successively in response to recorded calls of said different car until said selected car recedes to or beyond said predetermined relative position with reference to said different car.

18. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; individual quota means for said cars, each of said quota means being effective to limit the number of stops assigned to the corresponding car; means effective in the event that a selected car, advancing from the rear of a different car, passes a predetermined relative position with reference to said different car for operating said quota means of said different car; and means, effective in the event that said selected car attains a more suitable position than said different car for answering a recorded call of said different car, for causing said selected car to stop at the corresponding floor.

19. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; individual quota means for said cars, each of said quota means being effective to limit the number of stops assigned to the corresponding car; common stopping means for all of said cars as a group, comprising means for causing the first car of said group which attains a more suitable position and condition than the others, to stop at a floor for which any of said call storing means has recorded a desired stop; and means effective upon operation of the quota means for a given car, for preventing operation of said common stopping means to stop said given car.

20. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; individual limiting means for said cars, each of said limiting means being effective, upon operation, to prevent the assignment of further recorded calls to the corresponding car; common stopping means for all of said cars as a group, comprising means for causing the first car of said group which attains a more suitable position than the others, to stop at a floor for which any of said call storing means has recorded a desired stop; and means effective upon operation of said limiting means for a given car, for preventing operation of said common stopping means to stop said given car.

21. In an elevator system having a group of cars operable in a hatchway past a plurality of floors, call storing means for each car for recording desired stops of the corresponding car at any of said floors; switch means for registering desired stops at any selected one of said floors; zoning means for dividing the hatchway into zones of floors and for assigning a zone to each of said cars; means effective upon operation of said switch means for operating said call storing means to assign a call to the car having the zone which includes the floor corresponding to the desired stop; individual limiting means for said cars, each of said limiting means being effective, upon operation, to prevent the assignment of calls to the corresponding car additional to the calls already assigned thereto; and means effective in the event that one car passes another for transferring the zone of the passed car to a different car.

22. In an elevator system having a group of cars operable in a hatchway past a plurality of floors, call storing means for each car for recording desired stops of the corresponding car at any of said floors; a common floor switch for each of said floors for registering calls for service for the corresponding floor; zoning means for dividing the hatchway into zones of floors and for assigning a zone to each of said cars; means effective upon operation of any of said floor switches for operating said call storing means to assign a call to the car having the zone which includes the floor corresponding to the operated floor switch; individual limiting means for said cars, each of said limiting means being effective, upon operation, to prevent the assignment of calls to the corresponding car additional to the calls already assigned thereto; and means effective in the event that one car passes another for transferring the zone of the passed car to a different car.

23. In an elevator system having a group of cars operable in a hatchway past a plurality of floors, call storing means for each car for recording desired stops of the corresponding car at any of said floors; switch means for registering desired stops at any selected one of said floors; zoning means for dividing the hatchway into zones of floors and for assigning a zone to each of said cars; means effective upon operation of said switch means for operating said call storing means to assign a call to the car having the zone which includes the floor corresponding to the desired stop; individual limiting means for said cars, each of said limiting means being effective, upon operation, to prevent the assignment of calls to the corresponding car additional to the calls already assigned thereto; and means effective in the event that one car passes another for transferring the zone of the passed car to a different car and for operating said limiting means for the passed car.

24. In an elevator system having a group of cars operable in a hatchway past a plurality of floors, call storing means for each car for recording desired stops of the corresponding car at any of said floors; a common floor switch for each of said floors for registering calls for service for the corresponding floor; zoning means responsive to the positions of said cars for dividing the hatchway into zones of floors and for assigning a zone to each of said cars; means effective upon operation of any of said floor switches for operating said call storing means to assign a call to the car having the zone which includes the floor corresponding to the operated floor switch; individual limiting means for said cars, each of said limiting means being effective, upon operation, to prevent the assignment of calls to the corresponding car additional to the calls already assigned thereto; and means effective in the event that one car passes another for transferring the zone of the passed car to a different car and for operating said limiting means for the passed car.

25. In an elevator system having a group of cars operable in a hatchway past a plurality of floors, call storing means for each car for recording desired stops of the corresponding car at any of said floors; switch means for registering desired stops at any selected one of said floors;

motive apparatus individual to each of said cars; stopping means for each car responsive to the corresponding call storing means for controlling the corresponding motive apparatus to cause the car to stop at the floors for which calls are assigned; zoning means responsive to the positions of said cars for dividing the hatchway into zones of floors and for assigning a zone to each of said cars; means effective upon operation of said switch means for operating said call storing means to assign a call to the car having the zone which includes the floor corresponding to the desired stop; individual limiting means for said cars, each of said limiting means being effective, upon operation, to prevent the assignment of calls to the corresponding car additional to the calls already assigned thereto; and means effective in the event that one car passes another for transferring the zone of the passed car to a different car.

26. In an elevator system having a group of cars operable in a hatchway past a plurality of floors, call storing means for each car for recording desired stops of the corresponding car at any of said floors; a common floor switch for each of said floors for registering calls for service for the corresponding floor; motive apparatus individual to each of said cars; stopping means for each car responsive to the corresponding call storing means for controlling the corresponding motive apparatus to cause the car to stop at the floors for which calls are assigned; zoning means responsive to the positions of said cars for dividing the hatchway into zones of floors and for assigning a zone to each of said cars, means effective upon operation of any of said floor switches for operating said call storing means to assign a call to the car having the zone which includes the floor corresponding to the operated floor switch; individual limiting means for said cars, each of said limiting means being effective, upon operation, to prevent the assignment of calls to the corresponding car additional to the calls already assigned thereto; and means effective in the event that one car passes another for transferring the zone of the passed car to a different car.

27. In an elevator system having a group of cars operable past a plurality of floors, call storing means for each car and each floor effective to assign each desired stop at any of said floors to an individual one of said cars; limiting means for controlling said call storing means to restrict the number of stops assigned to the individual cars; and means effective in the event that a selected car, advancing from the rear of a different car passes a predetermined relative position with reference to said different car, for controlling said call storing means to prevent the assignment of any calls to said different car additional to the calls already assigned thereto.

28. In an elevator system having a group of cars operable past a plurality of floors, call storing means for each car for recording desired stops of the corresponding car at any of said floors; switch means for registering desired stops at any selected one of said floors; means effective upon operation of said switch means for immediately operating said call storing means to assign a call to an individual one of said cars for the floor at which a stop is desired; limiting means for controlling said call storing means to restrict the number of stops assigned to the individual cars; and means effective in the event that a selected car, advancing from the rear of a different car, passes a predetermined relative position with reference to said different car for controlling said call storing means to prevent the assignment of any calls to said different car additional to the calls already assigned thereto.

29. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; limiting means for controlling said call storing means to restrict the number of stops assigned to the individual cars; and means effective in the event that a selected car, advancing from the rear of a different car, passes a predetermined relative position with reference to said different car, for controlling said call storing means to prevent the assignment of any calls to said different car additional to the calls already assigned thereto.

30. In an elevator system having a group of cars operable past a plurality of floors; call storing means for each car and each floor effective to assign each desired stop at any of said floors to an individual one of said cars; motive apparatus individual to each of said cars; means for controlling said call storing means to limit the number of stops assigned to an individual car; common stopping means for all of said cars as a group, comprising means for causing the first car of said group, which attains a more suitable position and condition than the others, to stop at a floor for which any of said call storing means has recorded a desired stop; and means effective in the event that a selected car advancing from the rear of a different car, passes a predetermined relative position with reference to said different car, for preventing operation of said common stopping means to cause the stopping of said different car.

31. In an elevator system having a group of cars operable past a plurality of floors; call storing means for each car and each floor effective to assign each desired stop at any of said floors to an individual one of said cars; motive apparatus individual to each of said cars; stopping means for each car responsive to the corresponding call storing means for controlling the corresponding motive apparatus to cause the car to stop at the floors for which stops are recorded; means for controlling said call storing means to limit the number of stops assigned to an individual car; common stopping means for all of said cars as a group, comprising means for causing the first car of said group, which attains a more suitable position and condition than the others, to stop at a floor for which any of said call storing means has recorded a desired stop; and means effective in the event that a selected car, advancing from the rear of a different car, passes a predetermined relative position with reference to said different car, for preventing operation of said common stopping means to cause the stopping of said different car.

32. In an elevator system having a car operable past a plurality of floors, means for recording intended stops of said car at any of said floors; means for assigning different weighted values to the stops recorded on said first-mentioned means, dependent upon the position of the corresponding floors; and means for totalizing said weighted values.

33. In an elevator system having a car operable past a plurality of floors, means for recording intended stops of said car at any of said floors; means for assigning different weighted values to the stops recorded on said first-mentioned means, dependent upon the position of the corresponding floors; and means responsive to a predetermined total of said weighted values.

34. In an elevator system having a car operable past a plurality of floors, means for recording intended stops of said car at any of said floors; motive means for said car; stopping means for controlling said motive means to cause said car to stop at floors corresponding to the intended stops recorded on said first-mentioned means; means for assigning different weighted values to the stops recorded on said first-mentioned means, dependent upon the position of the corresponding floors; and means responsive to a predetermined total of said weighted values for limiting the number of stops made by said car.

35. In an elevator system having a car operable past a plurality of floors, means for recording intended stops of said car at any of said floors; signal elements corresponding to said floors; means controlled by said first-mentioned means for operating said signal elements corresponding to the stops recorded on said first-mentioned means; means for assigning different weighted values to the stops recorded on said first-mentioned means, dependent upon the position of the corresponding floors; and means responsive to a predetermined total of said weighted values for limiting the number of said signal elements operated.

36. In an elevator system having a group of cars operable past a plurality of floors, means individual to said cars for recording intended stops of the corresponding car at any of said floors; means for assigning different weighted values to the stops recorded on said first-mentioned means, dependent upon the position of the corresponding floors; and means individual to said cars for totalizing said weighted values for intended stops assigned thereto.

37. In an elevator system having a group of cars operable past a plurality of floors, means individual to said cars for recording intended stops of the corresponding car at any of said floors; means for assigning different weighted values to the stops recorded on said first-mentioned means, dependent upon the position of the corresponding floors; and means individual to said cars responsive to a predetermined total of said weighted values for calls assigned to the corresponding car.

38. In an elevator system having a group of cars operable past a plurality of floors, means individual to said cars for recording intended stops of the corresponding car at any of said floors; motive apparatus individual to each of said cars; stopping means for each car responsive to said first-mentioned means for controlling said motive apparatus for the corresponding car to cause the car to stop at the floors for which stops are recorded; means for assigning different weighted values to the stops recorded on said first-mentioned means, dependent upon the position of the corresponding floors; and individual means responsive to a predetermined total of said weighted values for calls assigned to the corresponding car for limiting the number of stops made by the car.

39. In an elevator system having a group of cars operable past a plurality of floors, means individual to said cars for recording intended stops of the corresponding car at any of said floors; signal elements for each of said cars for each of said floors; means controlled by said first-mentioned means for operating said signal elements corresponding to the stops recorded on said first-mentioned means; means for assigning different weighted values to the stops recorded on said first-mentioned means, dependent upon the position of the corresponding floors; and individual means responsive to a predetermined total of said weighted values for stops recorded for the corresponding car for modifying the assignment of operated signal elements among said cars.

HAROLD W. WILLIAMS.